(12) United States Patent
Nilsson et al.

(10) Patent No.: US 9,036,737 B2
(45) Date of Patent: May 19, 2015

(54) POLAR MODULATION

(71) Applicant: Ericsson Modems SA, Le Grand-Saconnex (CH)

(72) Inventors: Magnus Nilsson, Lund (SE); Paavo Väänänen, Nokia (FI); Sami Tapani Vilhonen, Lieto (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/376,556

(22) PCT Filed: Feb. 8, 2013

(86) PCT No.: PCT/EP2013/052542
§ 371 (c)(1),
(2) Date: Aug. 4, 2014

(87) PCT Pub. No.: WO2013/117698
PCT Pub. Date: Aug. 15, 2013

(65) Prior Publication Data
US 2014/0376662 A1   Dec. 25, 2014

Related U.S. Application Data

(60) Provisional application No. 61/598,013, filed on Feb. 13, 2012.

(30) Foreign Application Priority Data

Feb. 9, 2012 (EP) .................................... 12154767

(51) Int. Cl.
*H04L 27/36* (2006.01)
*H04L 27/34* (2006.01)

(52) U.S. Cl.
CPC .......... *H04L 27/3405* (2013.01); *H04L 27/361* (2013.01); *H04L 27/363* (2013.01)

(58) Field of Classification Search
CPC ..... H04L 27/34; H04L 27/362; H04L 1/0071; H04L 25/03834; H04L 1/0041
USPC ........................................................ 376/298
See application file for complete search history.

(56) References Cited

U.S. PATENT DOCUMENTS 6,621,876 B2   9/2003  Camp, Jr. et al.
8,831,159 B2 *  9/2014  Itkin ............................. 375/359
(Continued)

OTHER PUBLICATIONS

Mustafa, "Iterative bandwidth limitation for high efficiency EER power amplifier," in Proc. Int. Symp. Wireless Pervasive Computing (ISWPC), Feb. 2009, pp. 1-5.*
(Continued)

*Primary Examiner* — Juan A Torres
(74) *Attorney, Agent, or Firm* — Coats & Bennett, PLLC

(57) ABSTRACT

A modulator comprises a polar generation stage that generates an amplitude and phase component of a modulation signal, a differentiator stage that generates a differentiated phase component by differentiating the phase component; and an event detection stage that detects a high bandwidth event by detecting the amplitude component and/or the differentiated phase component meeting an event criterion. An inversion stage generates a modified amplitude component by inverting the amplitude component in response to detecting the high bandwidth event. A phase offset stage generates a modified differentiated phase component by, in response to detecting the high bandwidth event, adding to the differentiated phase component a phase offset having a magnitude of 180° and a sign opposite to a sign of the differentiated phase component. Amplitude and phase modulation stages employ the modified amplitude component and the modified differentiated phase component to respectively modulate the amplitude and frequency of a carrier signal.

16 Claims, 12 Drawing Sheets

(56) References Cited

U.S. PATENT DOCUMENTS

| | | |
|---|---|---|
| 2005/0136858 A1 | 6/2005 | Zipper |
| 2006/0038710 A1* | 2/2006 | Staszewski et al. ............ 341/143 |
| 2010/0067617 A1 | 3/2010 | Wilhelm |
| 2011/0051836 A1* | 3/2011 | Lee ............................... 375/268 |
| 2011/0116535 A1* | 5/2011 | Mori et al. .................... 375/224 |

OTHER PUBLICATIONS

Huang, "Investigation of polar transmitters for WCDMA handset applications," in Proc. Norchip Conf., Nov. 2006, pp. 155-158.*

Boos, Z. et al., "A Fully Digital Multimode Polar Transmitter Employing 17b RF DAC in 3G Mode", IEEE International Solid-State Circuits Conference, SSCC, Feb. 20, 2011, pp. 376-378, IEEE, San Francisco, CA.

Staszewski, R. et al., "Spur-Free All-Digital PLL in 65nm for Mobile Phones",2011 IEEE International Solid-State Circuits Conference Digest of Technical Papers (ISSCC), Feb. 20, 2011, pp. 52-54, IEEE, San Francisco, CA.

Zhuang, J. et al., "A Technique to Reduce Phase/Frequency Modulation Banwidth in a Polar RF Transmitter", IEEE Transactions on Circuits and Systems—I: Regular Papers, Feb. 1, 2010, pp. 2196-2207, vol. 57, No. 8, IEEE.

* cited by examiner

POLAR MODULATION

FIELD OF THE DISCLOSURE

The present disclosure relates to a modulator, a transmitter comprising the modulator, and a method of modulation.

BACKGROUND TO THE DISCLOSURE

The polar modulator is a good architecture for a radio transmitter when moving to more digitally intensive implementations. A transmitter for the Global System for Mobile Communications (GSM) and for Enhanced Data rates for GSM Evolution (EDGE), and comprising a polar modulator, is disclosed in "Spur-free all-digital PLL in 65 nm for Mobile Phones", B. Staszewski et al, IEEE International Solid State Circuits Conference, session 3.1, 2011. A transmitter for Wideband Code Division Multiple Access (WCDMA), and comprising a polar modulator, is disclosed in "A fully digital multimode polar transmitter employing 17b RF DAC in 3G mode", Z. Boos et al, IEEE International Solid State Circuits Conference, session 21.7, 2011. Such polar transmitters can be very power efficient. However, they are less well suited to use in wider band radio systems such as the Third Generation Partnership Project Long Term Evolution, referred to, for brevity, as LTE.

A problem with polar transmitters is that the bandwidth of the phase and amplitude modulation signals used for modulating the transmitter is much wider than the bandwidths of in-phase and quadrature-phase (I/Q) components of a modulation signal. Typically the bandwidth required to achieve good Adjacent Channel Leakage Ratio (ACLR) and Error Vector Magnitude (EVM) performance in a polar transmitter is three to four times higher than in a transmitter implementing modulation by I/Q components.

An additional problem with a polar transmitter is that the bandwidth of the composite signal, that is, a carrier signal after modulation by both the amplitude and phase modulation signals, is wider than the bandwidth of both the amplitude and phase modulation signals. This is because the amplitude and phase modulation signals are multiplied during modulation of the carrier signal, which is equivalent to convolution in the frequency domain.

This is especially a problem with systems such as LTE, which have a high modulation bandwidth. It is important in frequency division duplex (FDD) systems, such as LTE, as well as WCDMA, that the transmitter of a wireless communication device does not desensitise the receiver of the same device. A low ratio of duplex distance to modulation bandwidth can present a challenge. In WCDMA, the worst ratio of duplex distance to modulation bandwidth occurs when the duplex distance is 45 MHz and the modulation bandwidth is 3.84 MHz. In LTE, the worst ratio of duplex distance to modulation bandwidth occurs when the duplex distance is 80 MHz and the modulation bandwidth is 18 MHz. Therefore, in LTE the worst ratio of duplex distance to modulation bandwidth is 2.6 times smaller than in WCDMA, making it very challenging to build a polar modulator.

Another challenge when building a polar modulator for LTE is the very high frequency deviation required in a 2-point phase locked loop (PLL). In WCDMA, the required deviation is about ±10 MHz, and in LTE it is ±50 MHz. It is very challenging to generate such a wide linear tuning range and also a wide deviation reduces the available tuning range, limiting the ability to support multiple bands in one digitally controlled oscillator (DCO).

Yet another challenge with polar modulation is the time alignment requirement. When combining the amplitude and phase modulation signals, the timing must be very accurate, otherwise spectral growth and violation of transmitter ACLR and the receiver band noise requirements will occur.

SUMMARY OF THE PREFERRED EMBODIMENTS

According to a first aspect there is provided a modulator comprising:

a polar generation stage arranged for generating an amplitude component and a phase component of a modulation signal;

a differentiator stage arranged for generating a differentiated phase component by differentiating the phase component;

an event detection stage arranged for detecting a high bandwidth event by detecting at least one of the amplitude component and the differentiated phase component meeting an event criterion;

an amplitude inversion stage arranged for generating a modified amplitude component by inverting the amplitude component in response to detecting the high bandwidth event;

a phase offset stage arranged for generating a modified differentiated phase component by, in response to detecting the high bandwidth event, adding to the differentiated phase component a phase offset having a magnitude of 180 degrees and a sign opposite to a sign of the differentiated phase component;

an amplitude modulation stage arranged for employing the modified amplitude component to modulate the amplitude of a carrier signal; and a phase modulation stage arranged for employing the modified differentiated phase component to modulate the frequency of the carrier signal.

According to a second aspect there is provided a method of modulation, comprising:

providing an amplitude component and a phase component of a modulation signal;

generating a differentiated phase component by differentiating the phase component;

detecting a high bandwidth event by detecting at least one of the amplitude component and the differentiated phase component meeting an event criterion;

generating a modified amplitude component by inverting the amplitude component in response to detecting the high bandwidth event;

generating a modified differentiated phase component by, in response to detecting the high bandwidth event, adding to the differentiated phase component a phase offset having a magnitude of 180 degrees and a sign opposite to a sign of the differentiated phase component;

employing the modified amplitude component to modulate the amplitude of a carrier signal; and employing the modified differentiated phase component to modulate the frequency of the carrier signal.

Frequency modulation by a differentiated signal is equivalent to phase modulation by the signal without differentiation. Therefore, employing the modified differentiated phase component to modulate the frequency of the carrier signal is equivalent to employing the modified phase component, without differentiation, to modulate the phase of the carrier signal. Therefore, the modulator can provide a composite, amplitude and phase, modulated carrier signal. The inversion of the amplitude component in response to detecting a high bandwidth event, and in particular from the high bandwidth event, can results in the bandwidth of the modified amplitude component being smaller than the bandwidth of the amplitude component without the inversion. In order to compensate for the inversion of the amplitude component, a phase offset can be added to the differentiated phase component in response to detecting the high bandwidth event, and in particular from the high bandwidth event. The phase offset, which can be positive or negative, has a magnitude of 180 degrees, and its sign can be selected to be opposite to a sign of the differentiated phase component. The reduction in bandwidth can simplify implementation of a transmitter and reduce the bandwidth of the composite signal of a transmitter employing the modulator, reducing the peak frequency deviation and reducing the duplex distance noise, enabling a smaller duplex distance to be used, and can increase the tolerance to timing mismatch between the amplitude and phase components.

In a first preferred embodiment, the event criterion may comprise the magnitude of the differentiated phase component exceeding a phase threshold or equivalent frequency threshold. This feature enables the high bandwidth event to be detected in a low complexity manner.

The event detection stage may be arranged to detect local maxima and local minima of the differentiated phase component, and the event criterion may comprise the differentiated phase component at a detected one of the local maxima and local minima having a magnitude exceeding a phase threshold. Likewise, the method may comprise detecting local maxima and minima of the differentiated phase component, and the event criterion may comprise the differentiated phase component at a detected one of the local maximum and local minima having a magnitude exceeding a phase threshold. This enables the high bandwidth event to be detected in a low complexity manner.

In a second preferred embodiment, the event criterion may be applied to the amplitude component. When the modulation signal trajectory passes close to, or through, the origin, the amplitude component decreases in magnitude, and the rate of change of the phase component, and therefore the magnitude of the differentiated phase component, increases. Therefore, the amplitude can be indicative of the high bandwidth event, and indicative of the magnitude of the differentiated phase component, or indicative of the rate of change of the phase component. Detecting an occurrence of the amplitude component satisfying an event criterion may be used as a way of determining the occurrence of the high bandwidth event, and in particular of detecting when the magnitude of the differentiated phase component exceeds a phase threshold, or equivalently, the rate of change of the phase component exceeds a phase threshold.

The event criterion, may comprise the amplitude component being less than an amplitude threshold. This provides a criterion that can be implemented with low complexity. The amplitude threshold may be optimised for a specific system in which the modulator and method of modulation is used.

The polar generation stage may be arranged to generate the amplitude component and the phase component of the modulation signal from an in-phase component and a quadrature-phase component of the modulation signal. Likewise, in the method, providing the amplitude component and the phase component of the modulation signal may comprise providing an in-phase component and a quadrature-phase component of the modulation signal and generating the amplitude component and the phase component from the in-phase component and the quadrature-phase component. This feature contributes to a low complexity implementation and enables compatibility with existing equipment that delivers in-phase and quadrature-phase components of the modulation signal.

The event detection stage may be arranged to detect the occurrence of the amplitude component meeting the event criterion from the in-phase component and the quadrature-phase component. Likewise, in the method, the occurrence of the amplitude component meeting the event criterion may be detected from the in-phase component and the quadrature phase component. This feature can contribute to reducing delays in the modulator, or method of modulation, by enabling the high bandwidth event to be detected prior to the generation of the amplitude component and the phase component.

The event detection stage may be arranged to, in response to the high bandwidth event, adapt the modulation signal so that the amplitude component passes through zero, prior to the amplitude inversion stage inverting the amplitude component. Likewise, the method may comprise, in response to detecting the high bandwidth event, adapting the modulation signal so that the amplitude component passes through zero prior to inverting the amplitude component. This feature can improve bandwidth reduction by ensuring that the amplitude component is zero when the phase offset is added.

The event detection stage may be arranged to adapt the modulation signal so that the amplitude component passes through zero by adding a pulse to the in-phase component and to the quadrature-phase component. Likewise, in the method, adapting the modulation signal so that the amplitude component passes through zero may comprise adding a pulse to the in-phase component and to the quadrature-phase component. This enables a low complexity implementation of the adapting.

The modulator may comprise first and second delay stages arranged for delaying the modulation signal by storing, respectively, the in-phase component and the quadrature-phase component, and the event detection stage may be arranged to adapt the modulation signal so that the amplitude component passes through zero by adding the pulse to the stored in-phase component and to the stored quadrature-phase component. Likewise, the method may comprise delaying the modulation signal by storing the in-phase component and the quadrature-phase component, and adding the pulse to the in-phase component and to the quadrature-phase component may comprise adding a pulse to the stored in-phase component and to the stored quadrature-phase component. This feature facilitates a low complexity implementation of the adapting.

The pulse may be a raised cosine pulse or a Hanning filtered pulse. These types of pulse can enable a high reduction in bandwidth by providing a smooth, or gradual, transition between the modified portions of the modified amplitude component and the modified differentiated phase component and the adjacent unmodified portions of these components.

The phase modulation stage may comprise a phase locked loop arranged to generate the carrier signal and to modulate the frequency of the carrier signal with the modified differentiated phase component. Likewise, in the method, employing the modified differentiated phase component to modulate the frequency of the carrier signal may comprise employing a phase locked loop to generate the carrier signal and applying the modified differentiated phase component to the phase locked loop to modulate the frequency of the carrier signal. This enables the modulator and method of modulation to be versatile, for example enabling a programmable carrier frequency.

The phase locked loop may be arranged for two-point modulation. This feature enables the phase locked loop to have fast operation.

Generating the modified amplitude component by inverting the amplitude component may comprise inverting the sign of the amplitude component, and the amplitude modulation stage may comprise: an absolute stage arranged to generate a magnitude signal indicative of the magnitude of the modified amplitude component; a sign determining stage arranged to generate a sign indication indicative of the sign of the modified amplitude component; a phase inversion stage arranged to generate a signed modified differentiated phase component by inverting the modified differentiated phase component in response to the sign indication indicating that the modified amplitude component has a negative value; and a mixer arranged to multiply the magnitude signal by the signed modified differentiated phase component. Likewise, in the method, generating the modified amplitude component by inverting the amplitude component may comprise inverting the sign of the amplitude component, and employing the modified amplitude component to modulate the amplitude of the carrier signal and employing the modified differentiated phase component to modulate the frequency of the carrier signal may comprise: generating a magnitude signal indicative of the magnitude of the modified amplitude component; generating a sign indication indicative of the sign of the modified amplitude component; generating a signed modified differentiated phase component by inverting the modified differentiated phase component in response to the sign indication indicating that the modified amplitude component has a negative value; and multiplying the magnitude signal by the signed modified differentiated phase component. This feature can enable a low complexity implementation of the modulator.

The phase inversion stage may be arranged to invert the modified differentiated phase component by interchanging differential components of the modified differentiated phase component. Likewise, in the method, inverting the modified differentiated phase component may comprise interchanging differential components of the modified differentiated phase component. This feature can enable a low complexity implementation of the inversion.

The modulator may comprise a first filter coupled between the amplitude inversion stage and the amplitude modulation stage for filtering the modified amplitude component prior to employing the modified amplitude component to modulate the amplitude of a carrier signal. Likewise, the method may comprise filtering the modified amplitude component prior to employing the modified amplitude component to modulate the amplitude of a carrier signal. Such filtering can contribute to bandwidth reduction and can be of low complexity due to the bandwidth reduction resulting from the amplitude inversion.

The modulator may comprise second filter coupled between the phase offset stage and the phase modulation stage for filtering the modified differentiated phase component prior to employing the modified differentiated phase component to modulate the phase of the carrier signal. Likewise, the method may comprise filtering the modified differentiated phase component prior to employing the modified differentiated phase component to modulate the phase of the carrier signal. Such filtering can also contribute to bandwidth reduction.

The modulator may comprise a sign control stage arranged to control a sign of the phase offset to be opposite to a sign of the differentiated phase component. Likewise, the method may comprise controlling a sign of the phase offset to be opposite to a sign of the differentiated phase component. This feature can contribute to minimising the bandwidth of the modified differentiated phase component.

According to a third aspect, there is provided a transmitter comprising the modulator according to the first aspect.

BRIEF DESCRIPTION OF THE DRAWINGS

Preferred embodiments will now be described, by way of example only, with reference to the accompanying drawings, in which.

DETAILED DESCRIPTION OF PREFERRED EMBODIMENTS

Figure 1:
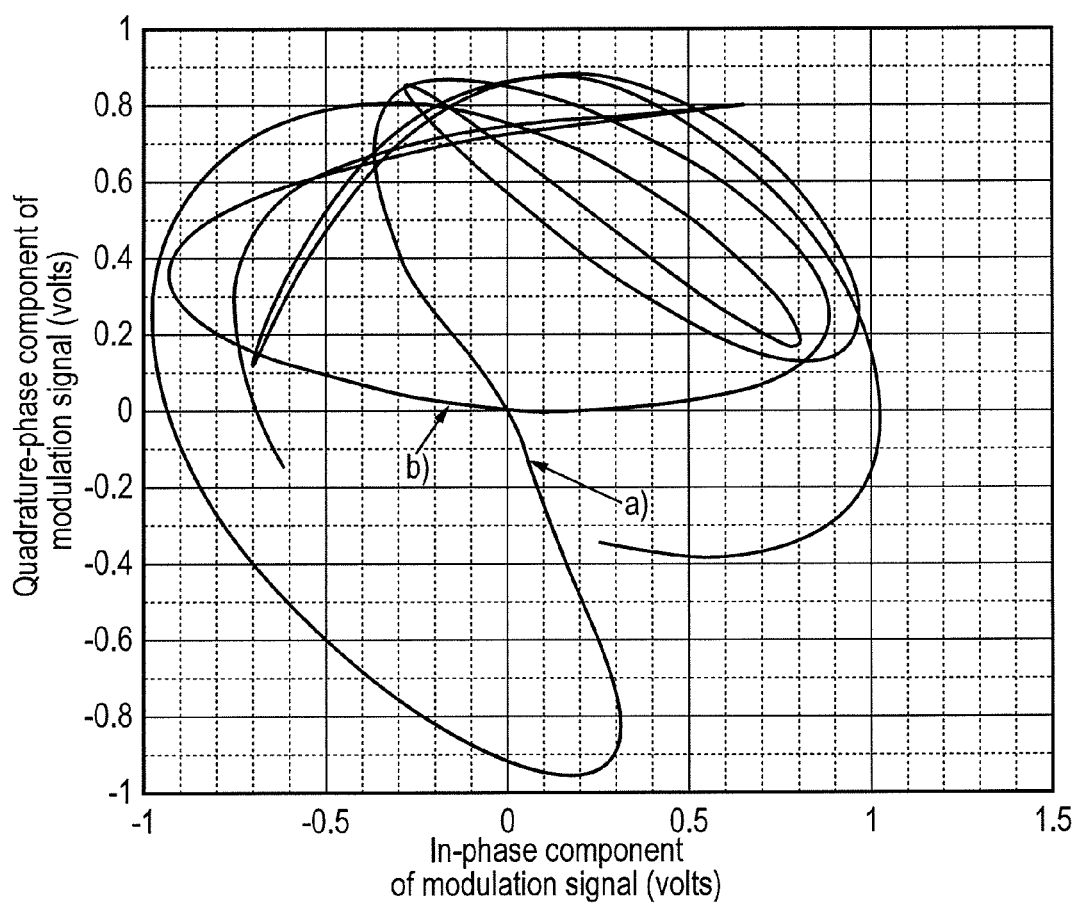
FIG. 1 illustrates an I/Q signal trajectory passing through the origin.

Referring to FIG. 1, the curves a) and b) are examples of the I/Q signal trajectory of the modulation signal, that is, the abscissa represents the in-phase signal component (I) and the ordinate represents the quadrature-phase signal component (Q), of the modulation signal. It can be seen that the signal trajectories a) and b) pass through the origin. The amplitude decreases as the signal trajectory approaches the origin, is zero at the point where the signal trajectory passes through the origin, and increases as the signal trajectory moves away from the origin. The fast change in amplitude at the origin results in the amplitude component having a high bandwidth.

Figure 2:
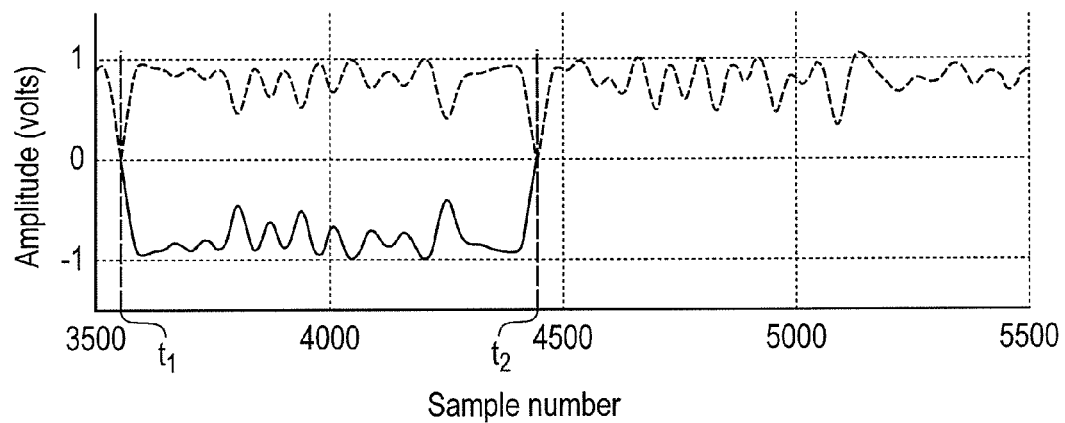
FIG. 2 illustrates an amplitude modulation component of a modulation signal before and after modification.

By inverting the amplitude component at the point where the signal trajectory passes through the origin, for example by inverting the sign of the amplitude component, the bandwidth of the amplitude component can be reduced. This is illustrated in FIG. 2 where the dashed line represents the waveform of the amplitude component prior to the inversion. In FIG. 2, the horizontal scale is sample number for an amplitude component in the digital domain and having a sampled format. At time $t_1$, the amplitude reaches zero and the inversion takes place, resulting in the inverted portion of the amplitude component represented by the solid line. The inversion removes the abrupt change of the amplitude component at time $t_1$. At time $t_2$, the amplitude again reaches zero and a second inversion takes place, resulting in the amplitude component continuing as represented by the dashed line. The second inversion removes the abrupt change of the amplitude component at time $t_2$. In this way, the modified amplitude component is equal to the initial, that is, un-modified, amplitude component prior to time $t_1$ and also after time $t_2$, and is equal to the inverted amplitude component during the period $t_1$ to $t_2$. During periods of inversion, such as from time $t_1$ to $t_2$, the modified amplitude component can be represented by negative values, whilst the remainder of the modified amplitude component has positive values. Therefore, the modified amplitude component may also be referred to as a signed amplitude component.

Figure 3:
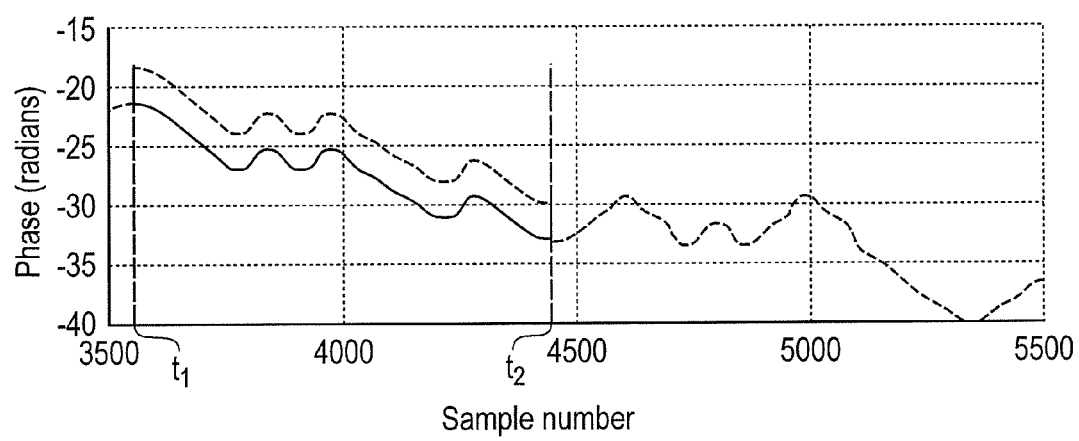
FIG. 3 illustrated a phase modulation component of the modulation signal.

Furthermore, as the signal trajectory illustrated in FIG. 1 passes through the origin, the phase of the modulation signal changes from a positive to a negative value, or from a negative to a positive value, by 180 degrees. The fast change in phase at the origin results in the phase component having a high bandwidth. This is illustrated in FIG. 3 where the dashed line represents the waveform of the phase component, and where an abrupt change of phase by 180 degrees, or $\pi$ radians, that is, 3.142 radians, takes place at times $t_1$ and $t_2$ where the signal trajectory passes through the origin. In FIG. 3, the horizontal scale is sample number for a phase component in the digital domain and having a sampled format. By adding a phase offset at times $t_1$ and $t_2$ the abrupt changes of phase can be reduced or removed, and the rate of change of the phase component can be reduced, as illustrated by the solid line in FIG. 3. The phase offset at time $t_2$ is equal in magnitude, but opposite in sign, to the phase offset at time $t_1$. In this way, the modified phase component is equal to the initial, that is, un-modified, phase component prior to time $t_1$ and also after time $t_2$, and is equal to the offset phase component during the period $t_1$ to $t_2$. The bandwidth of the modified phase component is reduced relative to the bandwidth of the initial, that is, un-modified, phase component.

The instants at which the amplitude component and the phase component should be modified, that is, times $t_1$ and $t_2$, can be determined either by monitoring the amplitude component and applying an amplitude criterion, or by monitoring the phase component and applying a phase criterion, as the events that result in a high bandwidth in the amplitude component coincide with the events that result in a high bandwidth in the phase component. In particular, the bandwidth of a composite modulated carrier signal, modulated by the modified amplitude component and the modified phase component, is minimised if the phase offset occurs, that is, is added, when the modified amplitude component is zero.

If the amplitude modulation component is represented as A, and the phase modulation component is represented as $\phi$, the composite modulated carrier signal produced by a polar modulator may be represented as $A \cdot e^{j\phi}$. If the modified amplitude component is represented as A*, having positive and negative values, the amplitude component A may be also be expressed as A=A*. SGN(A*), where SGN(A*) is the sign of A*, as multiplication of the modified amplitude component A* by SGN(A*) converts the negative values of A* to positive values. In addition, the phase modulated carrier signal $e^{j\phi}$ may be expressed as $e^{j\phi}=e^{j\phi^*} \cdot SGN(A^*)$, because the phase offset of 180 degrees in the modified phase component $\phi^*$ is equivalent to an inversion of the phase of the carrier signal, and multiplication of the phase modulated carrier signal by SGN(A*) is also equivalent to an inversion of the phase of the carrier signal, and these two inversions in the product $e^{j\phi^*} \cdot SGN(A^*)$ cancel out one another.

It is therefore possible to express the composite modulated carrier as $$A \cdot e^{j\phi} = A^* \cdot SGN(A^*) \cdot e^{j\phi^*} \cdot SGN(A^*) \quad (1)$$

As SGN(A*) has a value of +1 or −1, the product SGN(A*). SGN(A*)=1, so $$A \cdot e^{j\phi} = A^* \cdot e^{j\phi^*} \quad (2)$$

This demonstrates that the composite modulated carrier signal may be generated by phase modulating the carrier with the modified phase component, and amplitude modulating the carrier signal with the modified amplitude component.

Equation (1) may be rewritten as $$A \cdot e^{j\phi} = ABS(A^*) \cdot e^{j\phi^*} \cdot SGN(A^*) \quad (3)$$

as A*·SGN(A*)=ABS(A*), where ABS(A*) is the absolute value of the modified amplitude component. Therefore, an alternative way of generating the composite modulated carrier is to phase modulate the carrier signal with the modified phase component, invert the phase modulated carrier signal $e^{j\phi^*}$ according to the sign of the modified amplitude component, and to amplitude modulate the resulting phase modulated carrier with the absolute value of the modified amplitude component.

Although the modification of the phase component as described above entails adding a phase offset to the phase component, to provide the modified phase component, alternatively, the phase component $\phi$ may be differentiated to provide a differentiated phase component $\phi'$, and the phase offset added to the differentiated phase component, to provide a modified differentiated phase component $\phi'^*$. In a digital implementation where signals are processed in sampled form, differentiation of the phase component may comprise determining the phase difference between consecutive samples of the phase component. In this case, the differentiated phase component comprises successive phase differences between consecutive samples of the phase component. Differentiation of the phase component is appropriate where phase modulation of the carrier signal is implemented using a phase locked loop which frequency modulates the carrier signal, as frequency modulation using a differentiated modulation signal is equivalent to phase modulation using the modulation signal without the differentiation.

Figure 4:
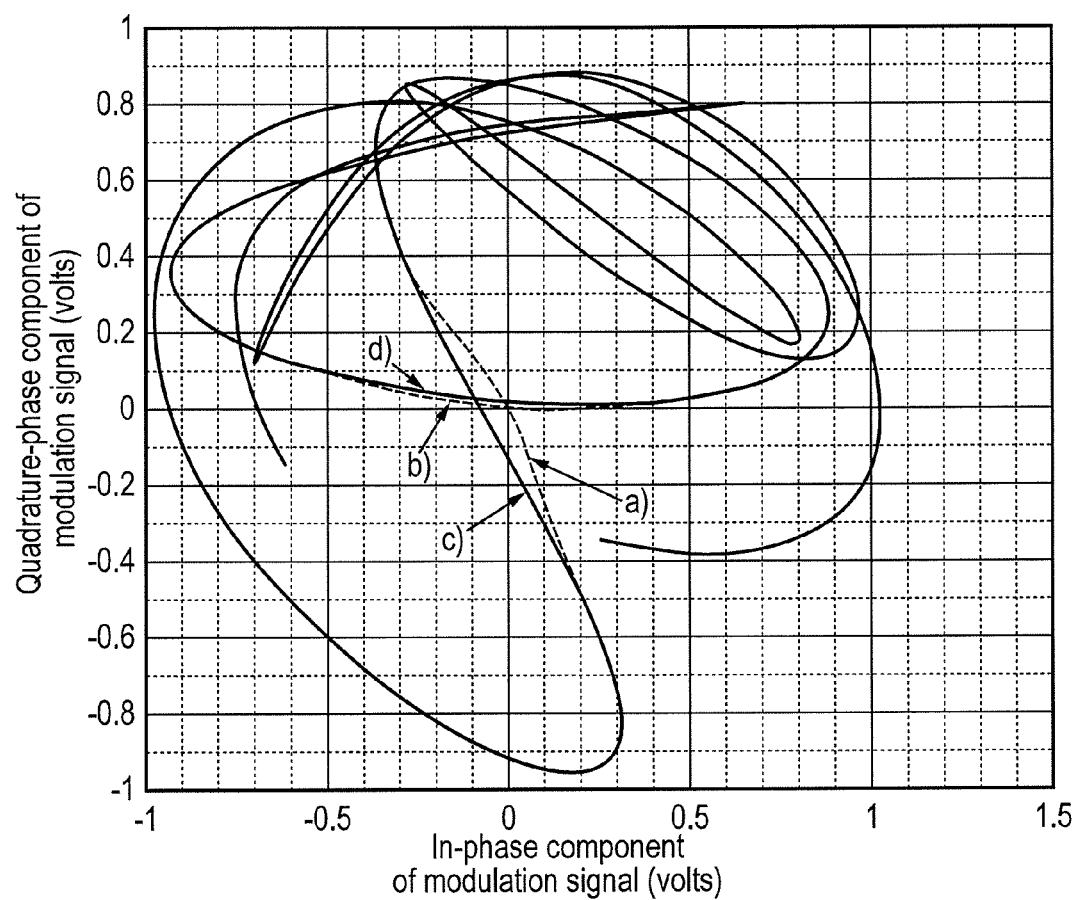
FIG. 4 illustrates an I/Q signal trajectory passing near the origin, and shifted to pass through the origin.

As described above with reference to FIG. 1, the signal trajectories a) and b) pass through the origin, resulting in a high bandwidth event. However, even if the signal trajectory does not pass through the origin, the bandwidth can be increased where the signal trajectory passes close to the origin. Examples of such a signal trajectories are represented by the curves c) and d) in FIG. 4. Referring to FIG. 4, it can be seen that the amplitude decreases as the signal trajectory approaches the origin and increases as the signal trajectory moves away from the origin. Again, the fast change in amplitude near the origin results in the amplitude component having a high bandwidth. Likewise, the phase component changes rapidly as the trajectory passes close to the origin, resulting in the phase component having a high bandwidth.

By inverting the amplitude component when the signal trajectory is near the origin, the amplitude component is changed to pass through zero. This can be appreciated from FIG. 2, where it can be readily seen that even if the amplitude component, prior to the inversion, does not fall to zero, the inversion results in the modified amplitude component continuing with negative values, and therefore inevitably the amplitude of the modified amplitude component has passed through zero. Where the amplitude component is processed as a sampled signal, the time at which the modified amplitude component reaches zero is, generally, between the last sample of the amplitude component prior to inversion and before the first sample of the modified amplitude component after inversion, or conversely, at the end of a period of amplitude inversion, between the last sample of the modified amplitude component prior to inversion and before the first sample of the amplitude component after inversion.

In order to further reduce the bandwidth of the amplitude component and the phase component, a signal trajectory which passes near to the origin can be adjusted by shifting it so that it passes through the origin at a sample instant, and then the technique described above of inverting the sign of the amplitude component and applying a phase offset to the phase component, or to the differentiated phase component, can be applied to the shifted signal trajectory. This can ensure that the addition of the phase offset is coincident with the modified amplitude component passing through zero.

Embodiments employing the techniques described above of inverting the amplitude component, adding the phase offset to the differentiated phase component, shifting the signal trajectory and generating a composite modulated carrier signal are described below, as are different ways of determining the occurrence of a high bandwidth event.

Figure 5:
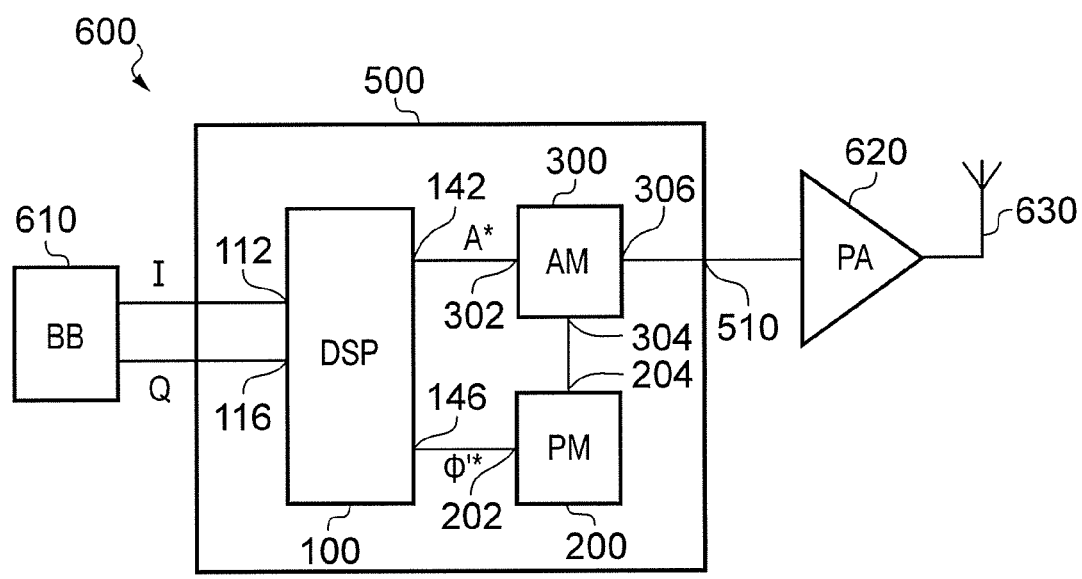
FIG. 5 is a block schematic diagram of a transmitter.

Referring to FIG. 5, a transmitter 600 comprises a baseband processor (BB) 610, which generates an in-phase component (I) and a quadrature-phase component (Q) of a modulation signal. In this embodiment, the in-phase component and the quadrature-phase component are generated in the digital domain in a sampled form, although this is not essential and they could alternatively be generated in the analogue domain. The baseband processor 610 is coupled to a modulator 500. The modulator 500 comprises a signal processing stage 100, which may be, for example, implemented in a digital signal processor (DSP). The signal processing stage 100 has an I-input 112 coupled to the baseband processor 610 for receiving the in-phase component and a Q-input 116 coupled to the baseband processor 610 for receiving the quadrature-phase component. The signal processing stage 100 converts the in-phase and quadrature-phase components to a polar format and introduces modifications, thereby generating the modified amplitude component A* which is delivered at an amplitude output 142 of the signal processing stage 100, and a modified differentiated phase component φ'* which is delivered at a differentiated phase output 146 of the signal processing stage 100.

The modulator 500 also comprises a phase modulation stage 200 which has a differentiated phase modulation input 202 coupled to the differentiated phase output 146 of the signal processing stage 100 for receiving the modified differentiated phase component. The phase modulation stage 200 generates a carrier signal and employs the modified differentiated phase component to modulate the frequency of the carrier signal. As stated above, frequency modulation of a carrier signal by a differentiated signal is equivalent to phase modulation of the carrier by the signal without differentiation. The phase modulation stage 200 has a phase modulated carrier output 204 for delivering a phase modulated carrier signal, the phase modulation being the integral of the modified differentiated phase component.

The modulator 500 also comprises an amplitude modulation stage 300 which has an amplitude modulation input 302 coupled to the amplitude modulation output 142 of the signal processing stage 100 for receiving the modified amplitude component, and a phase modulated carrier input 304 coupled to the phase modulated carrier output 204 of the phase modulation stage 200 for receiving the phase modulated carrier signal. The amplitude modulation stage 300 employs the modified amplitude component to modulate the amplitude of the phase modulated carrier signal, and the composite, amplitude and phase modulated, carrier signal is delivered at an output 306 of the amplitude modulation stage 300 which is coupled to a modulator output 510 of the modulator 500. A power amplifier (PA) 620 is coupled to the modulator output 510 for amplifying the composite carrier signal and an antenna 630 is coupled to an output of the power amplifier 620 for propagating the amplified composite carrier signal.

Figure 6:
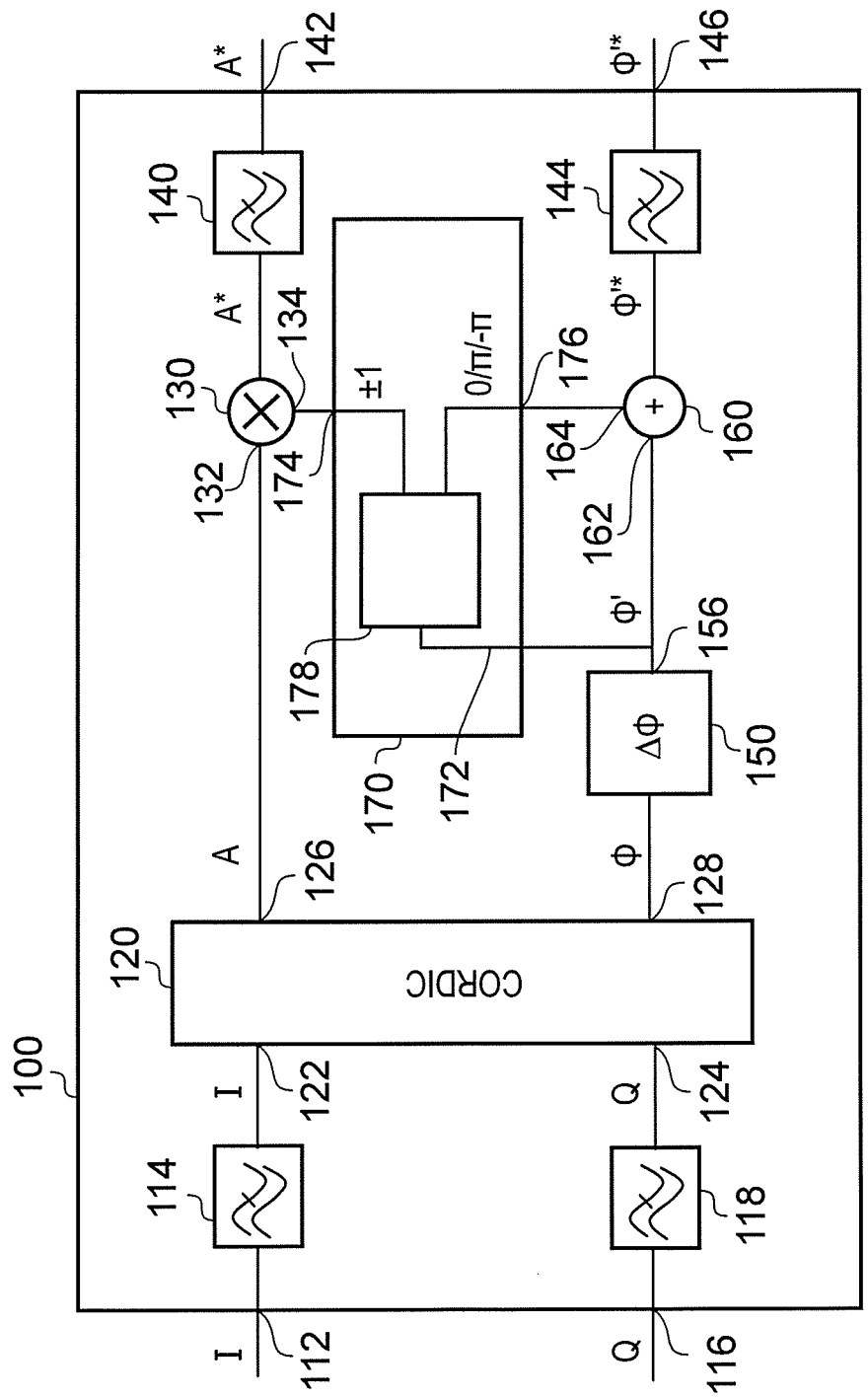
FIG. 6 is a block schematic diagram of a first embodiment of a signal processing stage.

In a first embodiment of the signal processing stage 100, a high bandwidth event is detected by assessing the phase component, or more specifically the differentiated phase component, of the modulation signal. Referring to FIG. 6, the first embodiment of the signal processing stage 100 comprises a polar generation stage (CORDIC) 120 having an I-input 122 coupled to the I-input 112 of the signal processing stage 100, by means of an I-component pulse shaping filter 114, for receiving the in-phase component I, and a Q-input 124 coupled to the Q-input 116 of the signal processing stage 100, by means of a Q-component pulse shaping filter 118, for receiving the quadrature-phase component Q. The I-component pulse shaping filter 114 and the Q-component pulse shaping filter 118 are optional elements and provide smoothing of the in-phase and quadrature-phase components of the modulation signal. The polar generation stage 120 employs the in-phase component and the quadrature-phase component to generate the amplitude component A and a phase component φ of the modulation signal using standard cordic functions. The amplitude component is delivered at an amplitude output 126 of the polar generation stage 120, and the phase component is delivered at a phase output 128 of the polar generation stage 120.

The phase output 128 of the polar generation stage 120 is coupled to an input of a differentiator stage 150. An output 156 of the differentiator stage 150 is coupled to a first input 162 of a summing stage 160. The differentiator stage 150 differentiates the phase component and delivers the differentiated phase component φ' to the first input 162 of the summing stage 160. A second input 164 of the summing stage 160 is coupled to a phase offset output 176 of an event detection stage 170 for receiving the phase offset.

The event detection stage 170 detects the occurrence of a high bandwidth event, and controls the generation of the modified amplitude component A* from the amplitude component, and the modified differentiated phase component φ'* from the differentiated phase component. The event detection stage 170 comprises a control stage (CONT) 178. A first input 132 of an amplitude inversion stage 130 is coupled to the amplitude output 126 for receiving the amplitude component. A second input 134 of the amplitude inversion stage 130 is coupled to a sign output 174 of the event detection stage 170 for receiving a sign indication, indicative of whether the sign of the amplitude component should be inverted. The sign indication may be, for example, +1 to indicate that no inversion is required, and −1 to indicate that inversion is required, and the amplitude inversion stage 130 multiplies the amplitude component by the sign indication. An output of the amplitude inversion stage 130 is coupled, by means of an optional amplitude-component filter 140, to the amplitude modulation output 142 of the signal processing stage 100 for delivering the modified amplitude component.

The summing stage 160 adds the phase offset to the differentiated phase component, and an output of the summing stage 160 is coupled to the phase modulation output 146 of the signal processing stage 100, by means of an optional phase-component filter 144, for delivering the modified differentiated phase component.

The control stage 178 has an input 172 coupled to the output 156 of the differentiator stage 150 for receiving the differentiated phase component. The control stage 178 employs the differentiated phase component to generate the sign indication, delivering the sign indication to the sign output 174 of the event detection stage 170, and to generate the phase offset, which it delivers to the phase offset output 176 of the event detection stage 170. The differentiated phase component is equivalent to the rate of change of the phase component, which is also equivalent to the frequency of the phase component. Therefore, a high value of the differentiated phase component is indicative of a fast rate of change of the phase component and a high frequency of the phase component, and is therefore indicative of a high bandwidth event in the modulation signal. A high bandwidth event can be detected by determining when the differentiated phase component has a value that exceeds a phase threshold $\phi$_lim, but which may also be considered to correspond to a frequency threshold FM_lim, as frequency is equal to the rate of change of phase. In a digital implementation of the signal processing stage 100, where the amplitude component and phase component are processed in a sampled form, the difference in value between consecutive samples of the phase component is indicative of the differentiated phase component. For example, where the signal trajectory passes through the origin, the difference in value between consecutive samples of the phase component which lie on either side of the origin is $\pi$ or $-\pi$, depending on the direction of signal trajectory. Optionally, the difference in value between consecutive samples of the phase component may be divided by the sample interval, to provide an indication of frequency of the phase component. The phase threshold may have a value that is system dependent, in order to optimise performance for a particular system.

When the event detection stage 170 has detected a high bandwidth event, it determines a value for the phase offset that it delivers at the phase offset output 176 of the event detection stage 170. This value can be either $\pi$ or $-\pi$, depending on the direction of signal trajectory, is the sign being selected to be opposite to the sign of the differentiated phase component at the high bandwidth event. Therefore, if the phase component is increasing at the high bandwidth event, such that the differentiated phase component is positive, the phase offset is selected to be $-\pi$, whereas if the phase component is decreasing at the high bandwidth event, such that the differentiated phase component is negative, the phase offset is selected to be $\pi$.

Where the signal trajectory passes through the origin, the difference in value between consecutive samples of the phase component on either side of the origin is $\pi$ or $-\pi$, and the addition of the phase offset by the summing stage 160 will cancel this difference, resulting in a reduction in bandwidth of the modified differentiated phase component, compared with the bandwidth of the differentiated phase component. Where the signal trajectory passes close to the origin, but not through the origin, the difference in value between consecutive samples of the phase component on either side of the origin is smaller in magnitude than $\pi$, and the addition of the phase offset by the summing stage 160 will not cancel this difference, resulting in a residual abrupt change in the differentiated phase component. However, the phase-component filter 144 can further reduce the bandwidth of the modified differentiated phase component. When no high bandwidth event has been detected, no phase offset is required and therefore the phase offset output 176 is set to zero.

Also, when the event detection stage 170, or more specifically the control stage 178, has detected a high bandwidth event, it determines a value for the sign indication that it delivers at the sign output 174 of the event detection stage 170. The sign indication is initially set to +1 and is maintained at this value until the detection of the first high bandwidth event, such as at time $t_1$ in FIG. 3. On detection of the first high bandwidth event, the sign indication is inverted, that is, is set to −1, and is maintained at −1 until the occurrence of the next high bandwidth event, such as at time $t_2$ in FIG. 3. In this way, the sign indication toggles at each high bandwidth event.

Figure 7:
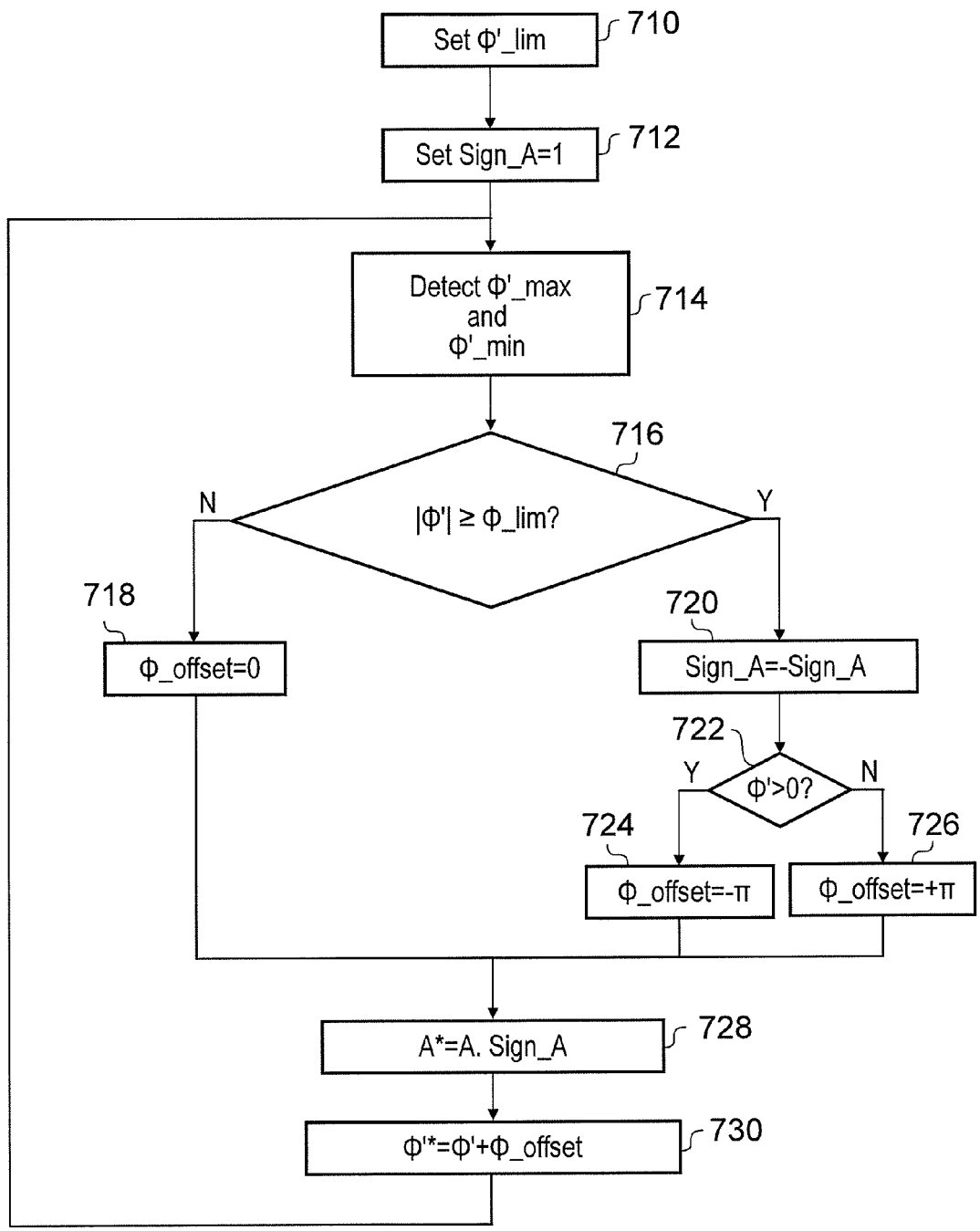
FIG. 7 is a flow chart of signal processing.

Referring to FIG. 7, there is illustrated a flow chart of steps that may be performed by the signal processing stage 100 described above with reference to FIG. 6 when processing samples of the amplitude and phase components in the digital domain. At step 710, the phase threshold $\phi$_lim is initialised. The phase threshold $\phi$_lim corresponds to the maximum frequency deviation permitted in the transmitted signal, and is therefore the maximum permitted magnitude of the differentiated phase component. At step 712, the sign indication, denoted Sign_A, is initialised to +1. Processing of the samples of the phase modulation component $\phi$, or more specifically, the difference between successive samples of the phase modulation component, which correspond to the differentiated phase component $\phi'$ or, equivalently, the frequency of the phase component, commences at step 714. At step 714, it is determined whether the differentiated phase component $\phi'$ has reached a maximum value $\phi'$_max or a minimum value $\phi'$_min within a window of samples. This may be performed by, for example, comparing each sample of the differentiated phase component with its preceding sample and its following sample, a maximum value $\phi'$_max being indicated when the preceding and following samples both have a value smaller than the value of the intermediate sample with which they are compared, and a minimum value $\phi'$_min being indicated when the preceding and following samples both have a value larger than the value of the intermediate sample with which they are compared. The minimum value $\phi'$_min will have a negative value, and so the preceding and following samples will both have a larger value, that is, a less negative value. When a maximum value $\phi'$_max or a minimum value $\phi'$_min has been determined, flow proceeds to step 716. At step 716, the magnitude of the determined maximum value $\phi'$_max or minimum value $\phi'$_min, denoted $|\phi'|$, is compared with the phase threshold $\phi$_lim. If $|\phi'|$ does not exceed $\phi$_lim, it is considered that no high bandwidth event has been detected, and flow proceeds to step 718 where the phase offset, denoted $\phi$_offset, is set to zero. Alternatively, if at step 716 $|\phi'|$ is greater than, or equal to, the phase threshold $\phi$_lim, it is considered that a high bandwidth event has been detected, and flow proceeds to step 720. At step 720, the sign indication Sign_A is inverted, that is, changed to −1 if currently set to +1, and changed to +1 if currently set to −1. Flow then proceeds to step 722 where it is determined whether the differentiated phase component $\phi'$ is positive, which is equivalent to the frequency deviation being positive, that is, an increase in the phase component with respect to the previous sample of the phase component. If the differentiated phase component $\phi'$ is positive, indicating that the phase component has increased at the high bandwidth event, the phase offset $\phi$_offset is set to −π at step 724. Conversely, if the differentiated phase component $\phi'$ is negative, indicating that the phase component has decreased at the high bandwidth event, the phase offset is set to π at step 726. From steps 718, 724 and 726 flow proceeds to step 728 where the modified amplitude component A*, also referred to as the signed amplitude component, is generated by multiplying the amplitude component by the sign indication Sign_A. Flow then proceeds to step 730 where the modified differentiated phase component, denoted $\phi'$* in FIG. 7, is generated by adding the phase offset $\phi$_offset to the differentiated phase component $\phi'$. Flow then returns to step 714 for processing the next sample of the amplitude component and the next sample of the differentiated phase component. The steps 710 to 726 may be performed by the event detection stage 170, with step 728 corresponding to the operation of the amplitude inversion stage 130, and step 730 corresponding to the operation of the summing stage 160.

Figure 8:
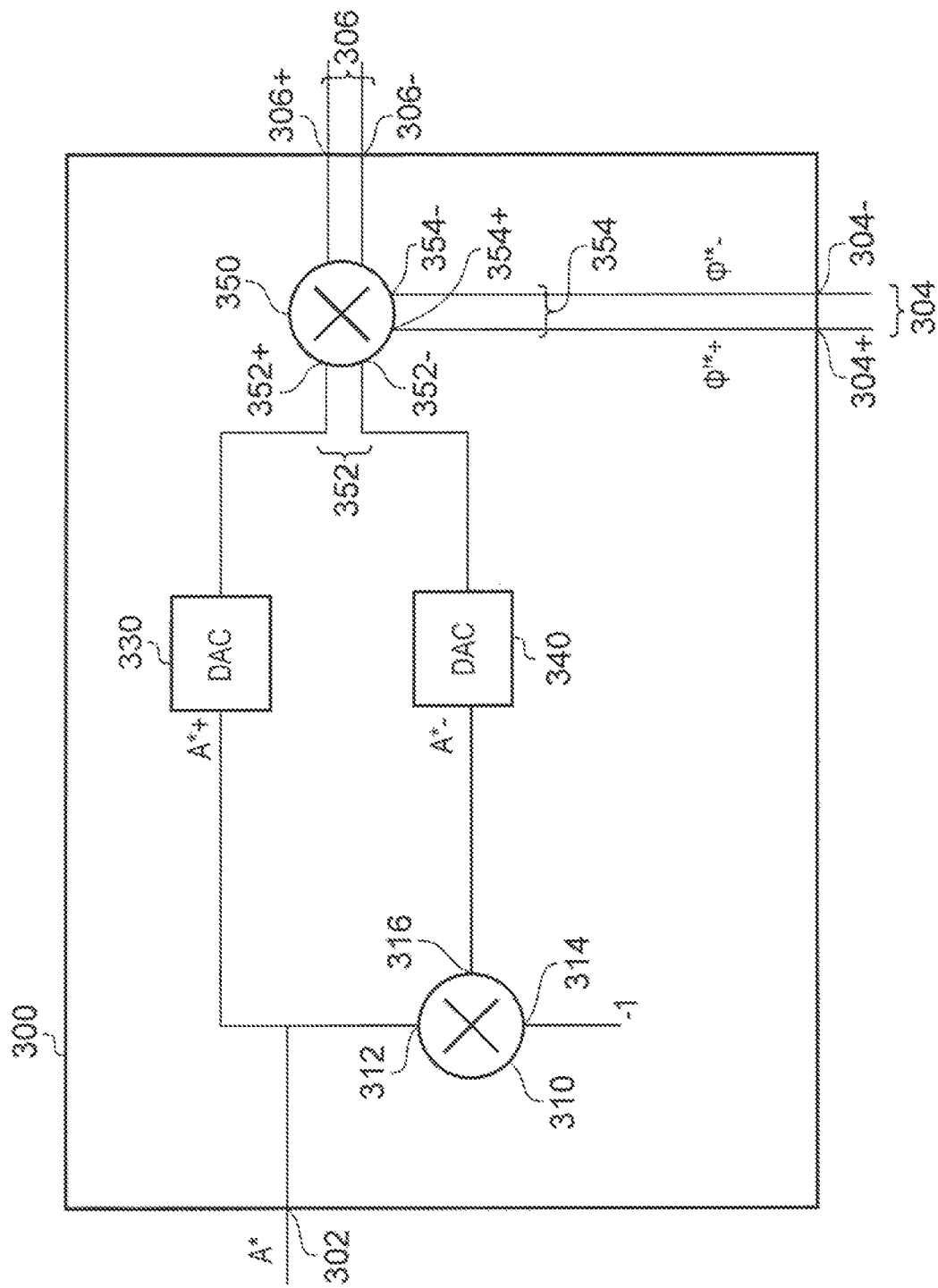
FIG. 8 is a block schematic diagram of a first embodiment of an amplitude modulation stage.

Referring to FIG. 8, a first embodiment of the amplitude modulation stage 300 comprises a mixer 350 having a first differential input 352 and a second differential input 354. The amplitude modulation input 302 of the amplitude modulation stage 300 is coupled to a positive input 352+ of the first differential input 352 of the mixer 350 by means of a first digital-to-analogue converter (DAC) 330. The amplitude modulation input 302 of the amplitude modulation stage 300 is also coupled to a first input 312 of a multiplier 310. A second input 314 of the multiplier is set to −1, and an output 316 of the multiplier 310 is coupled to a negative input 352− of the first differential input 352 of the mixer 350 by means of a second digital-to-analogue converter (DAC) 340. In this way, the mixer 350 is provided with positive and negative differential components A*+, A*− of the modified amplitude component A*. The first and second DACs 330, 340 are signed DACs capable of processing positive and negative input values.

The phase modulated carrier input 304 of the amplitude modulation stage 300 comprises positive and negative inputs 304+, 304− for receiving the frequency modulated, or equivalently the phase modulated, carrier signal in a differential format. The positive and negative inputs 304+, 304− of the phase modulated carrier input 304 are coupled to respective positive and negative inputs 354+, 354− of a second differential input 354 of the mixer 350. The mixer 350 multiplies the phase modulated carrier signal by the modified amplitude component in a differential format, thereby amplitude modulating the phase modulated carrier signal with the modified amplitude component, in effect forming the product on the right hand side of equation (2), and delivers the composite modulated carrier signal at positive and negative outputs 306+, 306− of the differential output 306 of the amplitude modulation stage 300.

Figure 9:
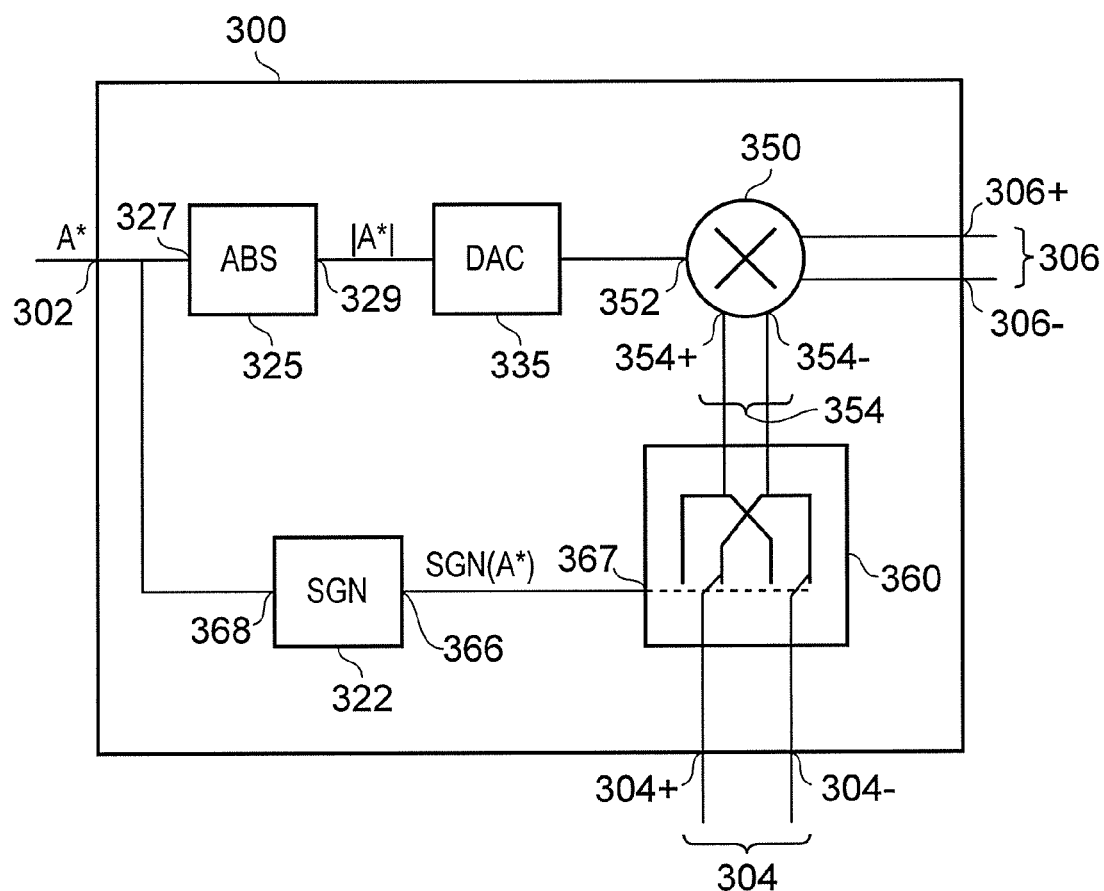
FIG. 9 is a block schematic diagram of a second embodiment of an amplitude modulation stage.

Referring to FIG. 9, in a second embodiment of the amplitude modulation stage 300, the amplitude modulation input 302 of the amplitude modulation stage 300 is coupled to an input 327 of an absolute stage 325 which generates a magnitude signal |A*| indicative of the magnitude of the modified amplitude component A*. An output 329 of the absolute stage 325 is coupled to a first input 352 of a mixer 350 by means of a DAC 335. The amplitude modulation input 302 of the amplitude modulation stage 300 is also coupled to an input 368 of a sign determining stage 322 which generates a sign indication SGN(A*) indicative of the sign of the modified amplitude component A*. An output 366 of the sign determining stage 322 is coupled to a control input 367 of a phase inversion stage 360, for delivering the sign indication to the phase inversion stage 360. The phase modulated carrier input 304 of the amplitude modulation stage 300 comprises positive and negative inputs 304+, 304− for receiving the phase modulated carrier signal in a differential format. The positive and negative inputs 304+, 304− of the phase modulated carrier input 304 are coupled to respective positive and negative inputs 354+, 354− of a second differential input 354 of the mixer 350 by means of the phase inversion stage 360, which may be, for example, a changeover switch. The phase inversion stage 360 is arranged for swapping, in response to the sign indication SGN(A*), the differential components of the phase modulated carrier signal which are then delivered to the positive and negative inputs 354+, 354− of the second differential input 354 of the mixer 350.

The mixer 350 multiplies the phase modulated carrier signal in a differential format by the magnitude signal |A*|, in effect forming the product on the right hand side of equation (3), and delivers the composite modulated carrier signal at positive and negative outputs 306+, 306− of the differential output 306 of the amplitude modulation stage 300.

Figure 10:
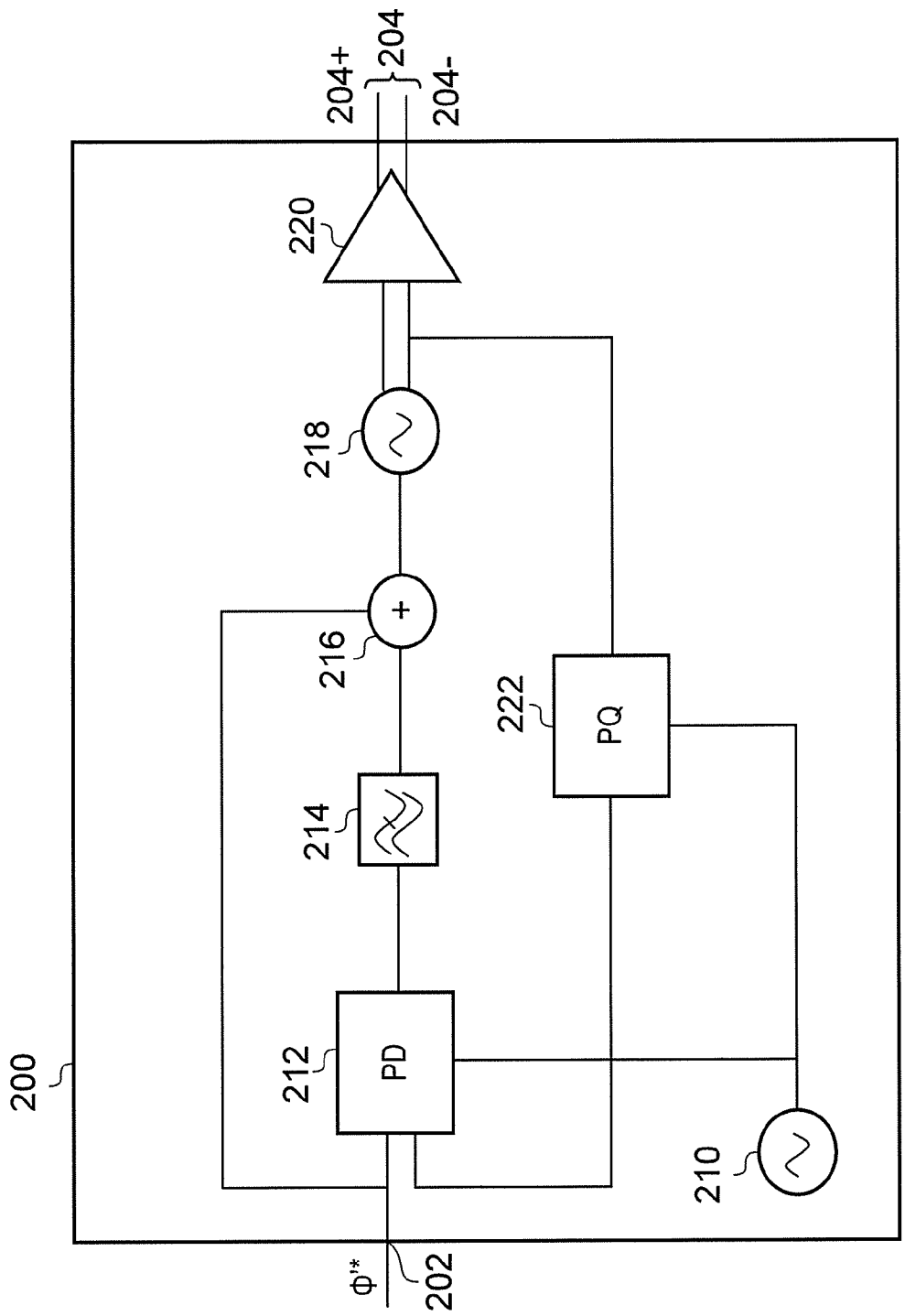
FIG. 10 is a block schematic diagram of a phase modulation stage.

Referring to FIG. 10, an embodiment of the phase modulation stage 200 comprises a phase locked loop arranged for two-point modulation. The phase modulation input 202 is coupled to a first input of a phase detector (PD) 212. An output of a reference oscillator 210, which generates a reference signal, is coupled to a second input of the phase detector 212 for clocking the phase detector 212. An output of the phase detector 212 is coupled by means of a loop filter 214 to a first input of an adder 216. A second input of the adder 216 is coupled to the phase modulation input 202. In this way, the modified differentiated phase component φ'* is applied to both the phase detector 212 and the adder 216. An output of the adder 216 is coupled to a control input of a digitally controlled oscillator (DCO) 218. An output of the DCO 218 is coupled to a first input of a phase quantisation stage (PQ) 222. A second input of the phase quantisation stage 222 is coupled to the output of the reference oscillator 210. The phase quantisation stage 222 generates an indication of the phase, or time, difference between the phase modulated carrier signal delivered at the output of the DCO 218 and the reference signal generated by the reference oscillator 210. An output of the phase quantisation stage 222, indicating the phase difference is coupled to a third input of the phase detector 212. The phase detector 212 subtracts the indicated phase difference from the modified differentiated phase component φ'*. The output of the DCO 218, in a differential format, is coupled to positive and negative outputs 204+, 204− of the phase modulated carrier output 204, also in a differential format, by means of an amplifier 220.

Figure 11:
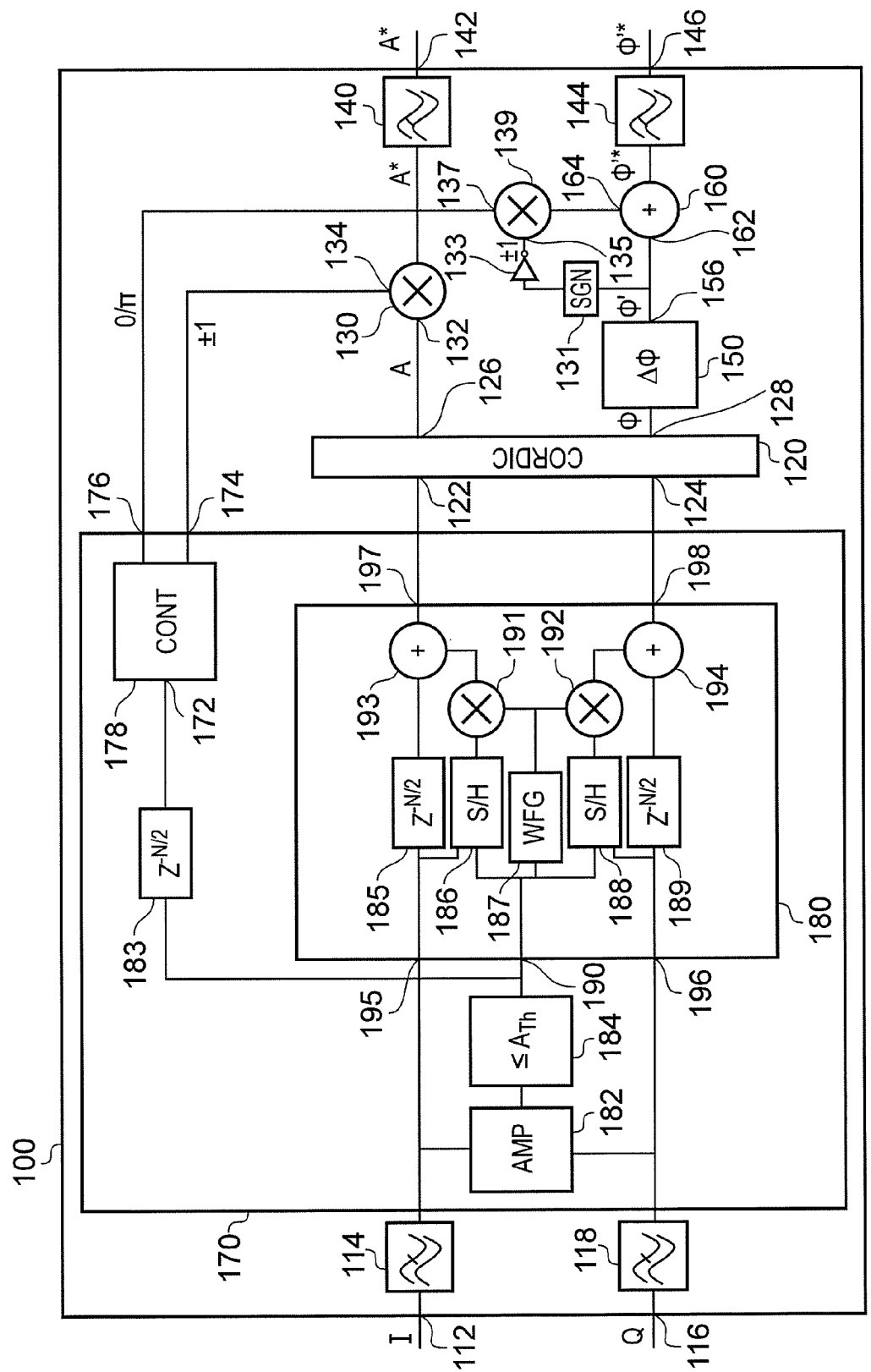
FIG. 11 is a block schematic diagram of a second embodiment of a signal processing stage.

In a second embodiment of the signal processing stage 100, a high bandwidth event is detected by assessing the amplitude of the modulation signal using the in-phase and quadrature-phase components of the modulation signal. Moreover, the second embodiment includes provision for adapting the amplitude component to pass through zero. Referring to FIG. 11, the second embodiment of the signal processing stage 100 comprises an I-input 112 for receiving the in-phase component I of the modulation signal and a Q-input 116 for receiving the quadrature-phase component Q of the modulation signal. The I-input 112 of the signal processing stage 100 is coupled to an I-input of an event detection stage 170 by means of an I-component pulse shaping filter 114. The Q-input 116 of the signal processing stage 100 is coupled to a Q-input of the event detection stage 170 by means of a Q-component pulse shaping filter 118. The I-component pulse shaping filter 114 and the Q-component pulse shaping filter 118 are optional elements and provide smoothing of the in-phase and quadrature-phase components of the modulation signal. The event detection stage 170 comprises a measurement stage (AMP) 182, a detection stage 184, an adaptation stage 180, a control delay stage 183 and a control stage (CONT) 178, which are described below. The Q-input of the event detection stage 170 is coupled to a Q-input 196 of the adaptation stage 180, and the I-input of the event detection stage 170 is coupled to an I-input 195 of the adaptation stage 180.

An I-input 195 of the adaptation stage 180 is coupled to an input of an I-component delay stage 185 for delaying the in-phase component of the modulation signal by a number of samples N/2. An output of the I-component delay stage 185 is coupled to a first input of an I-component summing stage 193. An output of the I-component summing stage 193 is coupled to an I-output 197 of the adaptation stage 180, which is itself coupled to an I-output of the event detection stage 170, and which is itself coupled to an I-input 122 of a polar generation stage (CORDIC) 120. A Q-input 196 of the adaptation stage 180 is coupled to an input of a Q-component delay stage 189 for delaying the quadrature-phase component of the modulation signal by a number of samples N/2. An output of the Q-component delay stage 189 is coupled to a first input of a Q-component summing stage 194. An output of the Q-component summing stage 194 is coupled to a Q-output 198 of the adaptation stage 180, which is itself coupled to a Q-output of the event detection stage 170, and which is itself coupled to a Q-input 124 of the polar generation stage 120.

The measurement stage 182 has a first input coupled to an output of the I-component pulse shaping filter 114 for receiving the in-phase component of the modulation signal after filtering by the I-component pulse shaping filter 114, and a second input coupled to an output of the Q-component pulse shaping filter 118 for receiving the quadrature-phase component of the modulation signal after filtering by the Q-component pulse shaping filter 118. The measurement stage 182 determines the amplitude of the modulation signal from the in-phase and quadrature-phase components of the modulation signal, for which it may employ standard cordic functions, and in particular determines local minima of the amplitude of the modulation signal. An input of the detection stage 184 is coupled to an output of the measurement stage 182 for receiving an indication of each minimum amplitude determined by the measurement stage 182, and detects whether the minimum amplitude of the modulation signal is greater than an amplitude threshold $A_{Th}$.

An output of the detection stage 184 is coupled to a control input 190 of the adaptation stage 180 for providing an indication of detection of a minimum amplitude of the modulation signal less than or equal to the amplitude threshold $A_{Th}$. The control input 190 of the adaptation stage 180 is coupled to an I-component sample-and-hold (S/H) store 186, a Q-component sample and hold store 188, and a waveform generator (WFG) 187. The I-component sample-and-hold (S/H) also has an input coupled to the I-input 195 of the adaptation stage 180 for receiving the in-phase component, and the Q-component sample-and-hold (S/H) also has an input coupled to the Q-input 196 of the adaptation stage 180 for receiving the quadrature-phase component. In response to the detection stage 184 detecting a minimum amplitude of the modulation signal less than or equal to the amplitude threshold $A_{Th}$, the I-component S/H store 186 stores the value of the in-phase component of the modulation signal at the minimum, and the Q-component S/H store 188 stores the value of the quadrature-phase component of the modulation signal at the minimum. In addition, in response to the detection stage 184 detecting a minimum amplitude of the modulation signal less than or equal to the amplitude threshold $A_{Th}$, the WFG 187 starts to generate an adaptation waveform of N samples, which may be a pulse. An output of the waveform generator 187 is coupled to a first input of an I-component adaptation mixer 191 and to a first input of a Q-component adaptation mixer 192. An output of the I-component S/H store 186 is coupled to a second input of the I-component adaptation mixer 191, and the I-component adaptation mixer 191 multiplies the adaptation waveform by the value of in-phase component of the modulation signal stored in the I-component S/H store 186, and delivers the resulting product at an output which is coupled to a second input of the I-component summing stage 193. An output of the Q-component S/H store 188 is coupled to a second input of the Q-component adaptation mixer 192, and the Q-component adaptation mixer 192 multiplies the adaptation waveform by the value of quadrature-phase component of the modulation signal stored in the Q-component S/H store 188, and delivers the resulting product at an output which is coupled to a second input of the Q-component summing stage 194. Therefore, the adaptation stage 180, in response to the detection of a minimum of the amplitude of the modulation signal not exceeding the amplitude threshold $A_{Th}$, commences adapting the in-phase and quadrature-phase components of the modulation signal, commencing N/2 samples before the detected minimum, by adding the adaptation waveform scaled by the co-ordinates of the minimum such that the minimum is shifted to zero. The adaptation continues for the N samples of the adaptation waveform, that is, until N/2 samples after the detected minimum.

Therefore, if the amplitude of the modulation signal is determined by the detection stage 184 to be less than or equal to the amplitude threshold $A_{Th}$, this indicates that the signal trajectory is close to the origin, and therefore that the modulation signal currently has a high bandwidth. When such a high bandwidth event is detected, the in-phase and quadrature-phase components of the modulation signal are delivered to the polar generation stage 120, after being adapted or changed by, the adaptation stage 180 as described above to shift the trajectory of the modulation signal to pass through the origin. Conversely, if the amplitude of the modulation signal is determined by the detection stage 184 to be greater than the amplitude threshold $A_{Th}$, this indicates that the modulation signal trajectory is not close to the origin, and therefore that the modulation signal currently does not have a high bandwidth. In this case, the in-phase and quadrature-phase components of the modulation signal are delivered to the polar generation stage 120 unmodified but merely delayed by, respectively, the I-component delay stage 185 and the Q-component delay stage 189.

The adaptation waveform may be a pulse. Suitable pulses are a raised cosine pulse or a Hanning filtered pulse, although other types of pulse may alternatively be used. A raised cosine pulse can enable greater control over the trade-off of degradation of EVM and degradation of ACLR. A narrow pulse can lead to degradation of ACLR, whereas a long pulse can lead to degradation of EVM. Although adaptation has been described in which a pulse is added to the in-phase and quadrature phase components of the modulation signals, other adaptations may alternatively be used, such as replacement of a portion of the in-phase and quadrature phase components by a waveform such as a pulse, or convolution of the in-phase and quadrature phase components with a waveform such as a pulse.

After the adaptation, the in-phase component delivered at the I-output 197 of the adaptation stage 180 corresponds to the in-phase component at the I-input 112 of the signal processing stage 100 with subsequent adaptation where high bandwidth events are detected, and likewise, the quadrature-phase component delivered at the Q-output 198 of the adaptation stage 180 corresponds to the quadrature-phase component at the Q-input 116 of the signal processing stage 100 with subsequent adaptation where high bandwidth events are detected.

A polar generation stage (CORDIC) 120 has an I-input 122 coupled to the I-output of the event detection stage 170 for receiving the in-phase component from the I-output 197 of the adaptation stage 180, and a Q-input 124 coupled to the Q-output of the event detection stage 170 for receiving the quadrature-phase component from the Q-output 198 of the adaptation stage 180. The polar generation stage 120 employs these in-phase and quadrature-phase components to generate the amplitude component A and the phase component φ of the modulation signal using standard cordic functions. The amplitude component is delivered at an amplitude output 126 of the polar generation stage 120, and the phase component is delivered at a phase output 128 of the polar generation stage 120.

The output of the detection stage 184 is coupled also to an input 172 of the control stage 178 by means of a first delay stage 183 for delaying, by a number of samples N/2, the indication from the detection stage 184 that a minimum amplitude of the modulation signal less than or equal to the amplitude threshold $A_{Th}$ has been detected. In response to such an indication, which signifies the occurrence of a high bandwidth event, the control stage 178 generates the sign indication Sign_A, which it delivers to the sign output 174 of the event detection stage 170, and generates the phase offset, which it delivers to the phase offset output 176 of the event detection stage 170.

A first input 132 of an amplitude inversion stage 130 is coupled to the amplitude output 126 of the polar generation stage 120 for receiving the amplitude component A. A second input 134 of the amplitude inversion stage 130 is coupled to the sign output 174 of the event detection stage 170 for receiving the sign indication Sign_A, indicative of whether the sign of the amplitude component is to be inverted. The sign indication may be, for example, +1 to indicate that no inversion is required, and −1 to indicate that inversion is required, and the amplitude inversion stage 130 may comprise a multiplier for multiplying the amplitude component A by the sign indication Sign_A. An output of the amplitude inversion stage 130 is coupled to the amplitude modulation output 142 of the signal processing stage 100, by means of an optional amplitude filter 140, for delivering the modified amplitude component A*. The sign indication may be initially set to +1 and maintained at this value until the detection of the first high bandwidth event, such as at time $t_1$ in FIG. 3. On detection of the first high bandwidth event, the sign indication may be inverted, that is, is set to −1, and maintained at −1 until the occurrence of the next high bandwidth event, such as at time $t_2$ in FIG. 3. In this way, the sign indication toggles at each high bandwidth event.

The phase output 128 of the polar generation stage 120 is coupled to an input of a differentiator stage 150, and an output 156 of the differentiator stage 150 is coupled to a first input 162 of a summing stage 160. The differentiator stage 150 differentiates the phase component and delivers the differentiated phase component to the first input 162 of the summing stage 160. The phase offset output 176 of the event detection stage 170 is coupled to a first input 137 of a multiplication stage 139 and provides an indication of the magnitude the required phase offset. This indication may be zero when no phase offset is required, and π when a phase offset is required as a result of detecting a high bandwidth event. A sign determining stage 131 has an input coupled to the output 156 of the differentiation stage 150 and determines the sign of the differentiated phase component. An output of the sign determining stage is coupled to a second input 135 of the multiplication stage 139 by means of an inversion stage 133. Therefore, the second input of the multiplication stage 139 receives an inverse indication of the sign of the differentiated phase component, which may be, for example, +1 if the differentiated phase component is negative and −1 if the differentiated phase component is positive. The multiplication stage 139 multiplies the indication of the magnitude of the required phase offset by the inverse indication of the sign of the differentiated phase component, providing at an output of the multiplication stage 139, which is coupled to a second input 164 of the summing stage 160, the phase offset, which is ±π when a high bandwidth event has been detected and is zero otherwise, the sign of the phase offset being selected to be opposite to the sign of the differentiated phase component. In this way, the sign of the phase offset is selected by the sign determining stage 131, the inversion stage 133 and the multiplication stage 139 which together form a sign control stage. The summing stage 160 adds the phase offset to the differentiated phase component, and an output of the summing stage 160 is coupled to the phase modulation output 146 of the signal processing stage 100, by means of an optional phase filter 144, for delivering the modified differentiated phase component.

As in the case of the signal processing stage 100 illustrated in FIG. 6, when the event detection stage 170 of the embodiment of FIG. 11 has detected a high bandwidth event, it determines a value for the phase offset that it delivers at the phase offset output 176. This value can be either π or −π, depending on the direction of signal trajectory, and is selected to reduce the rate of change of phase at the high bandwidth event. Where the signal trajectory passes through the origin, the difference in value between consecutive samples of the phase component on either side of the origin is π or −π, and the addition of the phase offset by the summing stage 160 will cancel the change of π or −π radians. Where the signal trajectory passes close to the origin, but not through the origin, the difference in value between consecutive samples of the phase component on either side of the origin is smaller in magnitude than π. However, the inversion of the amplitude component ensures that the signal trajectory is changed to pass through the origin, as described above, as a result of which the change in phase as the signal trajectory passes becomes ±π, and the phase offset of π or −π radians can cancel this phase change at the high bandwidth event, thereby reducing the rate of change of phase at the high bandwidth event. Consequently, the bandwidth of the modified differentiated phase component delivered at the phase modulation output 146 of the signal processing stage 100 is reduced with respect to the bandwidth of the phase modulation component and the differentiated phase modulation component.

Figure 12:
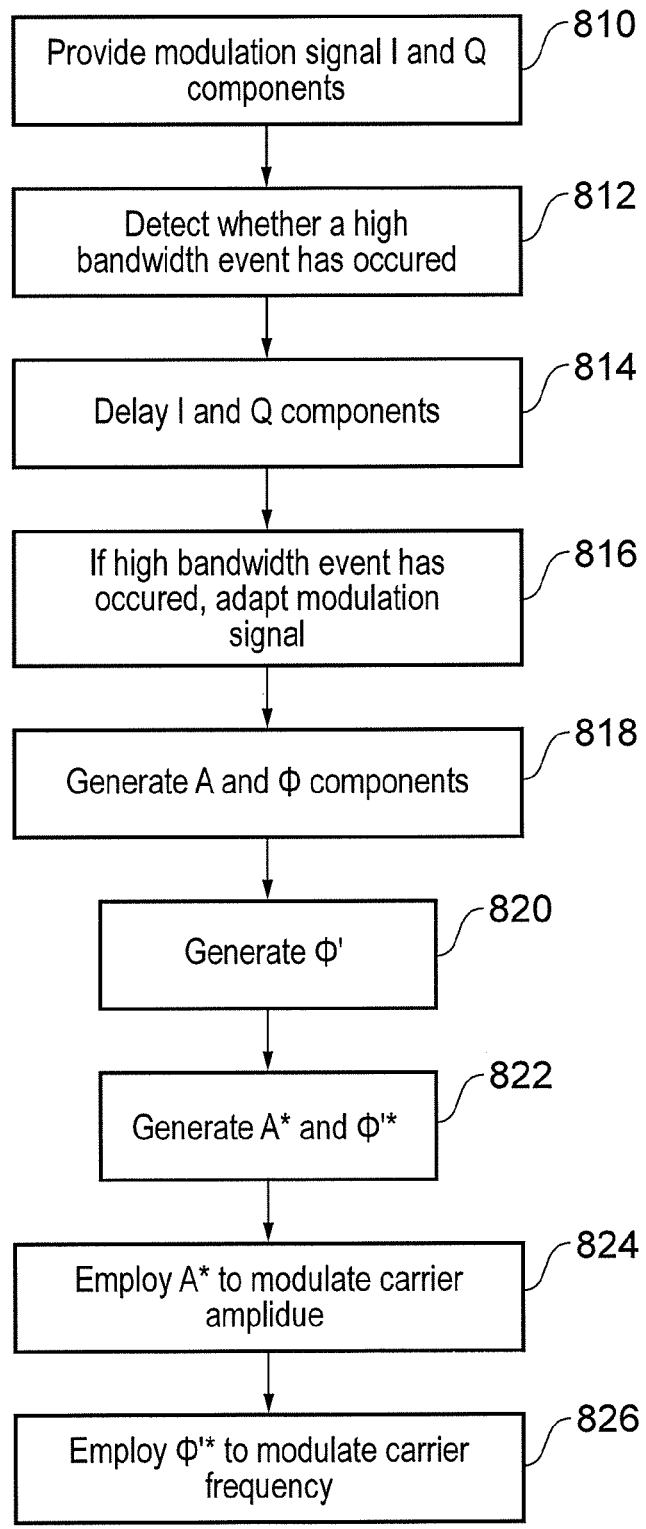
FIG. 12 is a flow chart of a method of modulation.

Referring to FIG. 12, a method of modulation comprises, at step 810, providing a modulation signal, the modulation signal having an in-phase component I and a quadrature-phase component Q. At step 812 a test is performed to detect whether a high bandwidth event has occurred, and the result of this test is recorded. At step 814, the modulation signal is delayed by storing the modulation signal, specifically the in-phase component and the quadrature-phase component, temporarily in a delay stage, such as the I-component delay stage 185 and the Q-component delay stage 189. At step 816, if the occurrence of a high bandwidth event has been recorded at step 812, the modulation signal stored in the delay stage is adapted to ensure that the modulation signal has zero amplitude at the occurrence of the high bandwidth event. This adaptation may comprise, for example, adding a pulse to the stored modulation signal, in particular, adding a pulse to the stored in-phase component and the quadrature-phase components. Storing the modulation signal enables the adaptation to modify the modulation signal preceding the high bandwidth event, as well as the modulation signal at and following the high bandwidth event, and therefore provide a gradual transition in the amplitude of the modulation signal leading to the zero amplitude.

At step 818, an amplitude component A and a phase component φ of the modulation signal are generated from the stored modulation signal, the stored modulation signal having been modified if necessary at step 816. Standard cordic functions may be employed for generating these amplitude and phase components from the in-phase and quadrature-phase components of the modulation signal. If the modulation signal was adapted at step 816, the amplitude component will, at this step, pass through zero at the occurrence of the high bandwidth event, as a result of the adaptation, and the phase component will have a phase change of ±π. At step 820, a differentiated phase component φ' is generated by differentiating the phase component φ.

At step 822, a modified amplitude component A* is generated by inverting the amplitude component from the occurrence of the high bandwidth event. In this way, the inversion of the amplitude component continues beyond the high bandwidth event, until the next high bandwidth event is detected, at which point inversion is applied again, which cancels the preceding inversion, that is, re-inverts the amplitude component until a further high bandwidth event is detected. Therefore, the modified amplitude component A* consists of alternate periods of inversion and re-inversion, each period commencing at a high bandwidth event.

Also at step 822, a modified differentiated phase component φ'* is generated by, if an occurrence of a high bandwidth event has been recorded at step 812, adding a phase offset having a magnitude of 180 degrees to the differentiated phase component φ' at the occurrence of the high bandwidth event. The sign of the phase offset is selected to be opposite to the sign of the differentiated phase component φ'. Therefore, if a high bandwidth event has not been recorded at step 812, the modified differentiated phase component φ'* is equal to the differentiated phase component φ'.

At step 824, the modified amplitude component A* is employed to modulate the amplitude of a carrier signal, and at step 826, the modified differentiated phase component φ'* is employed to modulate the frequency of the carrier signal. Flow may then return to step 810 for processing a continuing modulation signal.

Figure 13:
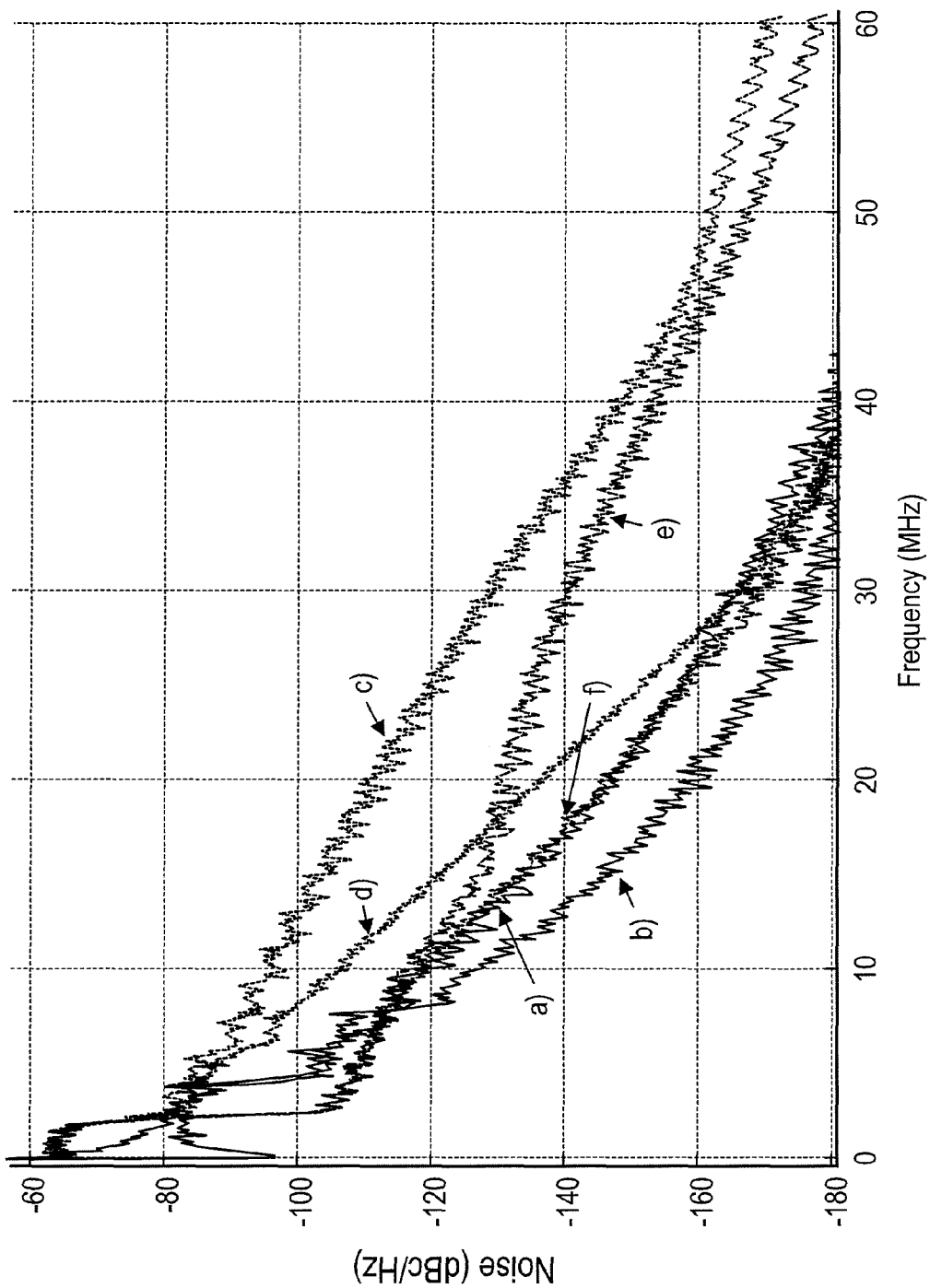
FIG. 13 is a graph showing spectra before and after modification of the modulation signal.

Referring to FIG. 13, graphs a) and b) illustrate, respectively, the spectra of the amplitude modulation component and the modified amplitude component of the modulation signal, graphs c) and d) illustrate, respectively, the spectra of the phase modulation component and the modified phase component of the modulation signal, graph e) illustrates the spectra of the transmitter output signal if it were to be modulated by both the amplitude and phase modulation components of the modulation signal using a prior art modulator, and graph f) illustrates the spectra of the transmitter output signal modulated by the modified amplitude and modified differentiated phase modulation using the modulator 500 described herein. The graphs of FIG. 13 relate to signals for WCDMA. For the purpose of displaying each of the graphs of FIG. 13, the signals for each graph are band limited using a third order Bessel filter having a bandwidth of 10 MHz. The graphs demonstrate that the bandwidth of the modified amplitude component, the modified differentiated phase component, and the composite signal modulated by both these components, is reduced significantly relative to the bandwidth without the modification. Also, in this example, the peak frequency deviation is halved from 10 MHz to 5 MHz. The reduction in bandwidth enables the target duplex distance noise to be provided at a lower duplex distance. The ACLR margin both with the modification and without is 10 dB. Moreover, the use of the modified amplitude and modified differentiated phase components provides a greater tolerance of timing mismatch between the amplitude and phase components. The dependency of the spectrum of the composite signal on time delay is significantly improved, particularly for the far-out spectrum. This can be intuitively understood since the bandwidth of the modified amplitude component and the modified differentiated phase component is reduced and no cancellation is required far-out. In the example illustrated in FIG. 12, the EVM is marginally degraded from 0.7% to 0.9% by using the modified amplitude and modified differentiated phase components. The selection of the amplitude threshold and phase threshold, or equivalent frequency threshold, enables a trade-off between reduced peak frequency deviation and reduced far-out noise, and degraded ACLR and EVM.

In a further embodiment of the signal processing stage 100, the measurement stage 182, the detection stage 184 and the adaptation stage 180, described with reference to FIG. 11, may be incorporated in the embodiment of the signal processing stage 100 described with reference to FIG. 6, between the I-component and Q-component pulse shaping filters 114, 118 and the polar generation stage 120, for adapting the in-phase and quadrature-phase components of the modulation signal to shift the trajectory of the modulation signal to pass through the origin prior to being processed by the polar generation stage 120. In this case, the detection of the high bandwidth event is performed by the event detection stage 170 on the differentiated phase component generated from the adapted in-phase and quadrature-phase components of the modulation signal, and so takes into account the effect of the adaptation, in contrast to the embodiment of FIG. 11, in which the event detection stage 170 detects the high bandwidth event based on the in-phase and quadrature-phase components of the modulation signal prior to their adaptation.

Although the modulator, method of modulation and transmitter have been described in the context of WCDMA and LTE, their application is not limited to LTE and they may be employed in other wireless systems.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A modulator comprising:
   a polar generation stage configured to generate an amplitude component and a phase component of a modulation signal;
   a differentiator stage configured to generate a differentiated phase component by differentiating the phase component of the modulation signal;
   an event detection stage configured to detect a high bandwidth event by detecting at least one of the amplitude component and the differentiated phase component meeting an event criterion;
   an amplitude inversion stage configured to generate a modified amplitude component by inverting the amplitude component in response to detecting the high bandwidth event;
   a phase offset stage configured to generate a modified differentiated phase component by, in response to detecting the high bandwidth event, adding, to the differentiated phase component, a phase offset having a magnitude of 180 degrees and a sign opposite to a sign of the differentiated phase component;

an amplitude modulation stage configured to modulate the amplitude of a carrier signal responsive to the modified amplitude component; and a phase modulation stage configured to modulate the frequency of the carrier signal responsive to the modified differentiated phase component.

2. The modulator as claimed in claim 1, wherein the event detection stage is configured to detect local maxima and local minima of the differentiated phase component, and wherein the event criterion comprises the differentiated phase component at a detected one of the local maxima and local minima having a magnitude exceeding a phase threshold.

3. The modulator as claimed in claim 1, wherein the event criterion comprises the amplitude component being less than an amplitude threshold.

4. The modulator as claimed in claim 1, wherein the polar generation stage is configured to generate the amplitude component and the phase component of the modulation signal from an in-phase component and a quadrature-phase component of the modulation signal.

5. The modulator as claimed in any claim 1, wherein the amplitude inversion stage generates the modified amplitude component by inverting the sign of the amplitude component, and wherein the amplitude modulation stage comprises:

an absolute stage configured to generate a magnitude signal indicative of the magnitude of the modified amplitude component;

a sign determining stage configured to generate a sign indication indicative of the sign of the modified amplitude component;

a phase inversion stage configured to generate a signed modified differentiated phase component by inverting the modified differentiated phase component in response to the sign indication indicating that the modified amplitude component has a negative value; and a mixer configured to multiply the magnitude signal by the signed modified differentiated phase component.

6. The modulator as claimed in claim 4, wherein the event detection stage is configured to detect the occurrence of the amplitude component meeting the event criterion from the in-phase component and the quadrature-phase component.

7. The modulator as claimed in claim 5, wherein the phase inversion stage is configured to invert the modified differentiated phase component by interchanging differential components of the modified differentiated phase component.

8. The modulator as claimed in claim 6, wherein the event detection stage is configured to, in response to the high bandwidth event, adapt the modulation signal so that the amplitude component passes through zero, before the amplitude inversion stage inverts the amplitude component.

9. The modulator as claimed in claim 8, wherein the event detection stage is configured to adapt the modulation signal so that the amplitude component passes through zero by adding a pulse to the in-phase component and to the quadrature-phase component.

10. The modulator as claimed in claim 9, further comprising first and second delay stages configured to delay the modulation signal by storing, respectively, the in-phase component and the quadrature-phase component, wherein the event detection stage is configured to adapt the modulation signal so that the amplitude component passes through zero by adding the pulse to the stored in-phase component and to the stored quadrature-phase component.

11. The modulator as claimed in claim 9, wherein the pulse comprises one of a raised cosine pulse and a Hanning filtered pulse.

12. A transmitter comprising a modulator, the modulator comprising:

a polar generation stage configured to generate an amplitude component and a phase component of a modulation signal;

a differentiator stage configured to generate a differentiated phase component by differentiating the phase component of the modulation signal;

an event detection stage configured to detect a high bandwidth event by detecting at least one of the amplitude component and the differentiated phase component meeting an event criterion;

an amplitude inversion stage configured to generate a modified amplitude component by inverting the amplitude component in response to detecting the high bandwidth event;

a phase offset stage configured to generate a modified differentiated phase component by, in response to detecting the high bandwidth event, adding, to the differentiated phase component, a phase offset having a magnitude of 180 degrees and a sign opposite to a sign of the differentiated phase component;

an amplitude modulation stage configured to modulate the amplitude of a carrier signal responsive to the modified amplitude component; and a phase modulation stage configured to modulate the frequency of the carrier signal responsive to the modified differentiated phase component.

13. A method of modulation comprising:

providing an amplitude component and a phase component of a modulation signal;

generating a differentiated phase component by differentiating the phase component of the modulation signal;

detecting a high bandwidth event by detecting at least one of the amplitude component and the differentiated phase component meeting an event criterion;

generating a modified amplitude component by inverting the amplitude component in response to detecting the high bandwidth event;

generating a modified differentiated phase component by, in response to detecting the high bandwidth event, adding, to the differentiated phase component, a phase offset having a magnitude of 180 degrees and a sign opposite to a sign of the differentiated phase component;

modulating the amplitude of a carrier signal responsive to the modified amplitude component; and modulating the frequency of the carrier signal responsive to the modified differentiated phase component.

14. The method of modulation as claimed in claim 13, comprising adapting, in response to the high bandwidth event, the modulation signal so that the amplitude component passes through zero, before the inverting of the amplitude component.

15. The method of modulation as claimed in claim 14, wherein providing the amplitude and phase components of the modulation signal comprises generating the amplitude component and the phase component of the modulation signal from an in-phase component and a quadrature-phase component of the modulation signal, and wherein adapting the modulation signal comprises adding a pulse to the in-phase component and to the quadrature-phase component.

16. The method of modulation as claimed in claim 15, further comprising delaying the modulation signal by storing the in-phase component and the quadrature-phase component, wherein adding the pulse to the in-phase component and to the quadrature-phase component comprises adding the pulse to the stored in-phase component and to the stored quadrature-phase component.

* * * * *

UNITED STATES PATENT AND TRADEMARK OFFICE
CERTIFICATE OF CORRECTION

PATENT NO.         : 9,036,737 B2                                          Page 1 of 1
APPLICATION NO.    : 14/376556
DATED              : May 19, 2015
INVENTOR(S)        : Nilsson et al.

It is certified that error appears in the above-identified patent and that said Letters Patent is hereby corrected as shown below:

In the claims

In Column 21, Line 24, in Claim 5, delete "in any" and insert -- in --, therefor.

Signed and Sealed this
Twelfth Day of April, 2016

Michelle K. Lee
*Director of the United States Patent and Trademark Office*